(12) United States Patent
Takada

(10) Patent No.: US 9,019,399 B2
(45) Date of Patent: Apr. 28, 2015

(54) TWO-DIMENSIONAL SIGNAL ENCODING DEVICE

(75) Inventor: Jun Takada, Tokyo (JP)

(73) Assignee: NEC Corporation, Tokyo (JP)

( * ) Notice: Subject to any disclaimer, the term of this patent is extended or adjusted under 35 U.S.C. 154(b) by 112 days.

(21) Appl. No.: 13/980,189

(22) PCT Filed: Nov. 30, 2011

(86) PCT No.: PCT/JP2011/006681
§ 371 (c)(1),
(2), (4) Date: Jul. 17, 2013

(87) PCT Pub. No.: WO2012/101708
PCT Pub. Date: Aug. 2, 2012

(65) Prior Publication Data
US 2013/0300893 A1 Nov. 14, 2013

(30) Foreign Application Priority Data

Jan. 28, 2011 (JP) ................. 2011-016231

(51) Int. Cl.
*H04N 5/228* (2006.01)
*H04N 9/68* (2006.01)
*G06K 9/36* (2006.01)
*G06K 9/46* (2006.01)
*G06T 3/40* (2006.01)
*H04N 19/635* (2014.01)
*H04N 19/176* (2014.01)
*H04N 19/124* (2014.01)
*H04N 19/18* (2014.01)
*H04N 19/169* (2014.01)

(52) U.S. Cl.
CPC .............. *H04N 5/228* (2013.01); *G06T 3/4015* (2013.01); *H04N 19/176* (2013.01); *H04N 19/124* (2013.01); *H04N 19/18* (2013.01); *H04N 19/1883* (2013.01); *H04N 19/635* (2013.01)

(58) Field of Classification Search
None
See application file for complete search history.

(56) References Cited

U.S. PATENT DOCUMENTS

| | | | | |
|---|---|---|---|---|
| 6,154,493 A * | 11/2000 | Acharya et al. | ........... | 375/240.19 |
| 8,014,597 B1 * | 9/2011 | Newman | ........................ | 382/166 |
| 8,063,948 B2 * | 11/2011 | Oizumi | ........................ | 348/223.1 |
| 2005/0213812 A1 * | 9/2005 | Ishikawa et al. | ............... | 382/166 |
| 2005/0219660 A1 * | 10/2005 | Atsumi et al. | ................. | 358/518 |
| 2006/0083432 A1 * | 4/2006 | Malvar | ........................ | 382/232 |
| 2007/0019087 A1 * | 1/2007 | Kuno et al. | .................... | 348/273 |
| 2008/0231735 A1 * | 9/2008 | Sheikh | ........................ | 348/273 |
| 2010/0046859 A1 * | 2/2010 | Hitomi et al. | ................. | 382/300 |
| 2010/0097491 A1 * | 4/2010 | Farina et al. | ................. | 348/223.1 |
| 2010/0277628 A1 * | 11/2010 | Sawada et al. | ................. | 348/280 |

FOREIGN PATENT DOCUMENTS

| | | |
|---|---|---|
| JP | 2001-86524 A | 3/2001 |
| JP | 2001-285643 A | 10/2001 |

(Continued)

*Primary Examiner* — Albert Cutler
(74) *Attorney, Agent, or Firm* — Sughrue Mion, PLLC

(57) ABSTRACT

The device for encoding a Bayer pattern image includes a two-dimensional high-pass filtering means for calculating a GH coefficient which is a high-pass component corresponding to a space coordinate of a G1 pixel, from the value of the G1 pixel and the values of four G0 pixels in the neighborhood of the G1 pixel; a two-dimensional low-pass filtering means for calculating a GL coefficient which is a low-pass component corresponding to a space coordinate of a G0 pixel, from the value of the G0 pixel and the values of four GH coefficients in the neighborhood of the G0 pixel; a first encoding means for encoding a two-dimensional signal including the GH coefficient; and a second encoding means for encoding a two-dimensional signal including the GL coefficient.

6 Claims, 16 Drawing Sheets

(56) References Cited

FOREIGN PATENT DOCUMENTS

| JP | 2003-92765 A | 3/2003 |
| JP | 2005-286415 A | 10/2005 |
| JP | 2006-121669 A | 5/2006 |
| JP | 2008-311874 A | 12/2008 |
| JP | 4436733 B2 | 3/2010 |
| JP | 2011-130275 A | 6/2011 |
| WO | 2009/087783 A1 | 7/2009 |

* cited by examiner

TWO-DIMENSIONAL SIGNAL ENCODING DEVICE

CROSS REFERENCE TO RELATED APPLICATIONS

This application is a National Stage of International Application No. PCT/JP2011/006681, filed on Nov. 30, 2011, which claims priority from Japanese Patent Application No. 2011-016231, filed on Jan. 28, 2011, the contents of all of which are incorporated herein by reference in their entirety.

TECHNICAL FIELD

The present invention relates to a two-dimensional signal encoding device, and in particular, to an encoding device for a Bayer pattern image.

BACKGROUND ART

Digital still cameras and digital video cameras for capturing color images, using a single plate photosensitive sensor (image pickup device) and a color filter array, have been widespread. A color filter array is formed such that tiny filters each transmitting only a particular color such as R, G, or B are arranged cyclically. As a typical filter arrangement method adopted in a color filter array, Bayer pattern has been known.

In the Bayer pattern, filters of respective colors, namely R (red), G (green), and B (blue), are arranged in a mosaic for each logical pixel block (hereinafter simply referred to as a block) of 2*2 pixels. Among them, G filters are arranged over 2 pixels diagonally positioned in a block of 2*2 pixels. This means that G filters are arranged over pixels at top left and bottom right positions, or top right and bottom left positions, of a 2*2 pixel block, and an R filter and a B filter are arranged over the remaining pixels. Consequently, signal values of R, G0, B, and G1 are obtained for each block of 2*2 pixels. Among them, G0 and G1 are two signals of G components diagonally positioned in the block.

Meanwhile, as the quantity of data of image signals captured by a digital camera is very large in the state of current signals, the quantity of data is reduced by image compression encoding processing in many cases.

Patent Document 2 discloses an example of an encoding method for a Bayer pattern image. In the method disclosed in Patent Document 2, an average value Gi of four neighboring G pixels, on the top, bottom, left, and right, is subtracted from values of R and B pixels of a Bayer pattern to thereby form a Bayer pattern with (R-Gi), Gi, (B-Gi). Then, based on the (R-Gi), Gi, (B-Gi) Bayer image, interpolation processing is performed on each space coordinate to thereby calculate an RGB pixel value in each space coordinate. Then, the RGB pixel value, calculated in this manner, is transformed to YCbCr, and is encoded using a known method such as JPEG.

Patent Documents 3, 4, and 5 disclose other exemplary encoding methods for a Bayer pattern image. In the methods disclosed therein, color transform is performed directly on an image signal of a Bayer pattern to generate a two-dimensional signal of 4 components, and encoding is performed independently on an image of these 4 components. This means that operation of color transform is performed among R, G0, B, and G1 pixels in a block of 2*2 pixels, and each transformed component is input to a compressor. In Patent Document 3, regarding R, B, and G1, a difference between G0 is encoded, while G0 component is encoded directly. Further, in Patent Document 4, R, G0, B, and G1 are transformed to Y, Dg, Co, and Cg respectively, and in Patent Document 5, R, G0, B, and G1 are transformed to Y, Cb, Cr, and Cg respectively, and then, they are encoded.

Patent Document 1: JP 2001-285643 A
Patent Document 2: JP 2008-311874 A
Patent Document 3: JP 2005-286415 A
Patent Document 4: JP 2006-121669 A
Patent Document 5: JP 4436733 B

SUMMARY

In a Bayer pattern image, G components occupy a half of the entire components. As such, it is important how efficiently G components are encoded. However, in any of the encoding methods disclosed in Patent Documents 2 to 5 described above, it is difficult to efficiently encode G components, because none of them consider to realize electric concentration of G components by utilizing correlation among neighboring G components.

An object of the present invention is to provide a two-dimensional signal encoding device which solves the above-described problem, that is, a problem that it is difficult to efficiently encode G components in a Bayer pattern image.

A two-dimensional signal encoding device, according to an aspect of the present invention, is a device that encodes a Bayer pattern image output from an image pickup device, the image being formed such that a color filter array is configured in block units of 2*2 pixels and pixels having color components of the same type are arranged at two diagonal positions in the block. The two-dimensional signal encoding device includes a two-dimensional high-pass filtering means for, on an assumption that the pixels having the color components of the same type arranged at the two diagonal positions are a G0 pixel and a G1 pixel, calculating a GH coefficient which is a high-pass component corresponding to a space coordinate of the G1 pixel, from a value of the G1 pixel and values of four G0 pixels in the neighborhood of the G1 pixel;

a two-dimensional low-pass filtering means for calculating a GL coefficient which is a low-pass component corresponding to a space coordinate of the G0 pixel, from a value of the G0 pixel and values of four GH coefficients in the neighborhood of the G0 pixel;

a first encoding means for encoding a two-dimensional signal including the GH coefficient; and a second encoding means for encoding a two-dimensional signal including the GL coefficient.

Further, a two-dimensional signal encoding method, according to an aspect of the present invention, is a method for encoding a Bayer pattern image output from an image pickup device, the image being formed such that a color filter array is configured in block units of 2*2 pixels and pixels having color components of the same type are arranged at two diagonal positions in the block. The two-dimensional signal encoding method includes on an assumption that the pixels having the color components of the same type arranged at the two diagonal positions are a G0 pixel and a G1 pixel, calculating a GH coefficient which is a high-pass component corresponding to a space coordinate of the G1 pixel, from a value of the G1 pixel and values of four G0 pixels in the neighborhood of the G1 pixel;

calculating a GL coefficient which is a low-pass component corresponding to a space coordinate of the G0 pixel, from a value of the G0 pixel and values of four GH coefficients in the neighborhood of the G0 pixel;

encoding a two-dimensional signal including the GH coefficient; and encoding a two-dimensional signal including the GL coefficient.

Further, a two-dimensional signal decoding device, according to an aspect of the present invention, is a device that decodes a Bayer pattern image output from an image pickup device, the image being formed such that a color filter array is configured in block units of 2*2 pixels and pixels having color components of the same type are arranged at two diagonal positions in the block. The two-dimensional signal decoding device includes a first decoding means for, on an assumption that the pixels having the color components of the same type arranged at the two diagonal positions are a G0 pixel and a G1 pixel, decoding a GH coefficient which is a high-frequency component corresponding to a space coordinate of the G1 pixel;

a second decoding means for decoding a GL coefficient which is a low-frequency component corresponding to a space coordinate of the G0 pixel;

a two-dimensional inverse low-pass filtering means for calculating a value of the G0 pixel corresponding to the space coordinate of the G0 pixel, from a value of the GL coefficient and values of four GH coefficients in the neighborhood of the GL coefficient; and a two-dimensional inverse high-pass filtering means for calculating a value of the G1 pixel corresponding to the space coordinate of the G1 pixel, from a value of the GH coefficient and values of four G0 pixels in the neighborhood of the GH coefficient.

Further, a two-dimensional signal decoding method, according to an aspect of the present invention, is a method for decoding a Bayer pattern image output from an image pickup device, the image being formed such that a color filter array is configured in block units of 2*2 pixels and pixels having color components of the same type are arranged at two diagonal positions in the block. The two-dimensional signal decoding method includes on an assumption that the pixels having the color components of the same type arranged at the two diagonal positions are a G0 pixel and a G1 pixel, decoding a GH coefficient which is a high-frequency component corresponding to a space coordinate of the G1 pixel;

decoding a GL coefficient which is a low-frequency component corresponding to a space coordinate of the G0 pixel;

calculating a value of the G0 pixel corresponding to the space coordinate of the G0 pixel, from a value of the GL coefficient and values of four GH coefficients in the neighborhood of the GL coefficient; and calculating a value of the G1 pixel corresponding to the space coordinate of the G1 pixel, from a value of the GH coefficient and values of four G0 pixels in the neighborhood of the GH coefficient.

As the present invention has the above-described configuration, the present invention is able to encode G components in a Bayer pattern image efficiently.

EXEMPLARY EMBODIMENTS

Next, exemplary embodiments of the present invention will be described in detail with reference to the drawings.

First Exemplary Embodiment

Figure 1:
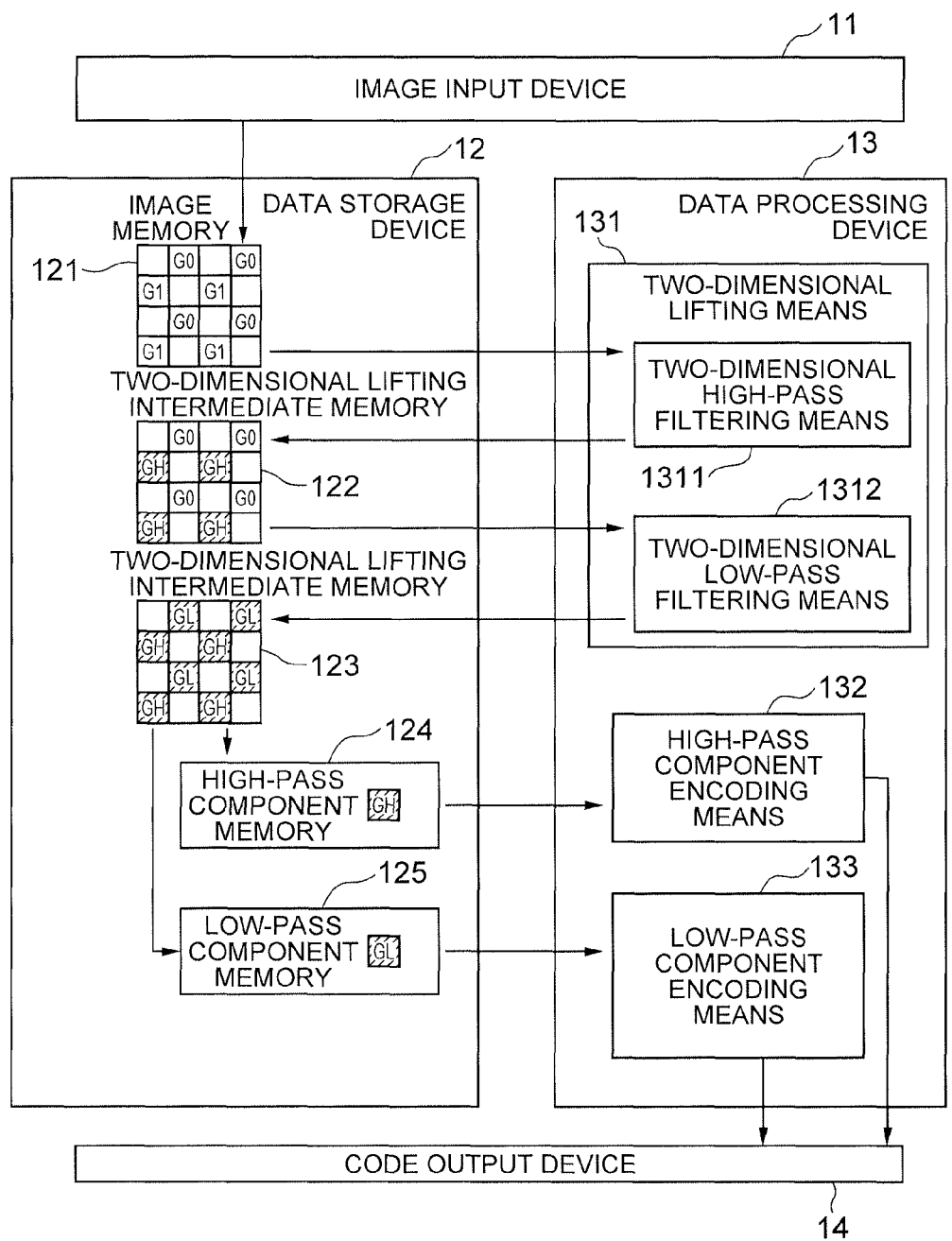
FIG. 1 is a block diagram showing a schematic configuration of an encoding device according to a first exemplary embodiment of the present invention.

Referring to FIG. 1, a first exemplary embodiment of the present invention includes an image input device 11, a data storage device 12, a data processing device 13 to be operated by program control, and a code output device 14.

The image input device 11 is a device for inputting images as two-dimensional signals, and is configured of a camera or a communication device, for example.

The data storage device 12 includes an image memory 121, a two-dimensional lifting intermediate memory 122, a two-dimensional lifting result memory 123, a high-pass component memory 124, and a low-pass component memory 125.

The image memory 121 stores images input from the image input device 11.

The two-dimensional lifting intermediate memory 122 stores coefficients obtained by performing two-dimensional high-pass filtering on the input images stored in the image memory 121.

The two-dimensional lifting result memory 123 stores coefficients obtained by performing two-dimensional low-pass filtering on the coefficients stored in the two-dimensional lifting intermediate memory 122.

The high-pass component memory 124 is an intermediate memory storing results of extracting only GH coefficients, serving as high-pass components, from among the coefficients stored in the two-dimensional lifting result memory 123.

The low-pass component memory 125 is an intermediate memory storing results of extracting only GL coefficients, serving as low-pass components, from among the coefficients stored in the two-dimensional lifting result memory 123.

The data processing device 13 includes a two-dimensional lifting means 131, a high-pass component encoding means 132, and a low-pass component encoding means 133. The two-dimensional lifting means 131 includes a two-dimensional high-pass filtering means 1311 and a two-dimensional low-pass filtering means 1312.

The two-dimensional high-pass filtering means 1311 included in the two-dimensional lifting means 131 reads pixel values G0 and G1 accumulated in the image memory 121, and stores coefficient values GH and pixel values G0, obtained by performing high-pass filtering, in the two-dimensional lifting intermediate memory 122.

Performing high-pass filtering means performing processing to subtract a quarter of the sum of the G0 pixels of neighboring 4 pixels from the value of each G1 pixel.

The two-dimensional low-pass filtering means 1312 included in the two-dimensional lifting means 131 reads coefficient values GH and pixel values G0 stored in the two-dimensional lifting intermediate memory 122, and stores coefficient values GL and GH, obtained by performing low-pass filtering, in the two-dimensional lifting result memory 123.

Performing low-pass filtering means performing processing to add one eighth of the sum of the GH coefficients of neighboring 4 pixels to the value of each G0 pixel.

The high-pass component encoding means 132 reads high-pass coefficients GH stored in the two-dimensional lifting result memory 123 via the high-pass component memory 124 and encodes them, and outputs them to the code output device 14.

The low-pass component encoding means 133 reads low-pass coefficients GL stored in the two-dimensional lifting result memory 123 via the low-pass component memory 125 and encodes them, and outputs them to the code output device 14.

The code output device 14 may be configured of a storage device such as a magnetic disk device which stores generated codes, or a communication device which transmits generated codes to a remote location.

Figure 2:
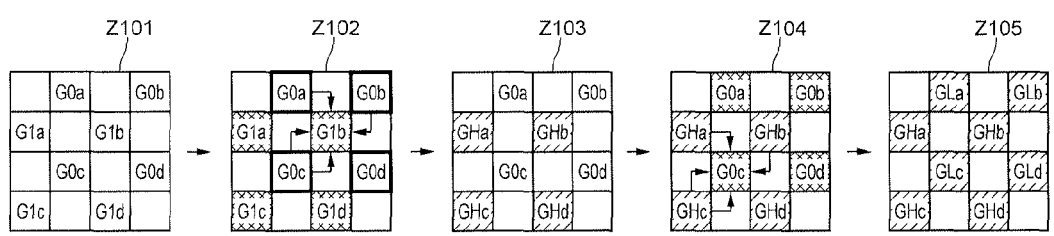
FIG. 2 is an illustration schematically showing an operation of a two-dimensional lifting means of the encoding device according to the first exemplary embodiment of the present invention.

FIG. 2 shows a specific example of an operation of the two-dimensional lifting means 131.

Z101 shows an arrangement of G0 and G1 pixels of an input image accumulated in the image memory 121. The input image has 4*4 pixels, and a color filter array is formed in block units of 2*2 pixels, whereby the image consists of four blocks. In Z101, four blocks are indicated by "a", "b", "c", and "d", and G0 and G1 pixels in the block "a" are shown in the form of G0a and G1a, for example.

Z102 shows a state of operation of the two-dimensional high-pass filtering means 1311. The two-dimensional high-pass filtering means 1311 performs processing to subtract a quarter of the sum of the neighboring G0 pixels on each of G1a, G1b, G1c, and G1d. For example, the two-dimensional high-pass filtering means 1311 performs processing to subtract a quarter of the sum of G0a, GM, G0c, and G0d from G1b. The two-dimensional high-pass filtering means 1311 performs similar processing on each of G1a, G1c, and G1d. If there are not four neighboring G0 pixels within the image region, other G0 pixel values within the image region may be used. In the case of G1a, for example, while G0a and G0c are present on the right side, there is no G0 pixel on the left side. In that case, processing may be performed on the assumption that G0a and G0c are also present on the left side. As a result of processing, the pixel values of G1a, G1b, G1c, and G1d of the input image are replaced by coefficient values of GHa, GHb, GHc, and GHd, respectively, and are stored in the two-dimensional lifting intermediate memory 122. Z103 shows a state of the two-dimensional lifting intermediate memory 122 after two-dimensional high-pass filtering has been performed.

Z104 shows a state of operation of the two-dimensional low-pass filtering means 1312. The two-dimensional low-pass filtering means 1312 performs processing to add one eighth of the sum of the neighboring GH coefficients to each of G0a, G0b, G0c, and G0d, respectively. For example, the two-dimensional low-pass filtering means 1312 performs processing to add one eighth of the sum of GHa, GHb, GHc, and GHd to G0c. The two-dimensional low-pass filtering means 1312 performs similar processing on the pixels G0a, G0b, and G0d, respectively. If there are not four neighboring GH coefficients within the image region, other GH coefficient values within the image region may be used. In the case of G0a, for example, while GHa and GHb are present on the bottom side, there is no GH coefficient on the top side. In that case, processing may be performed on the assumption that GHa and GHb are also present on the top side. As a result of processing, the pixel values of G0a, G0b, G0c, and G0d of the input image are replaced by coefficient values of GLa, GLb, GLc, and GLd, respectively, and are stored in the two-dimensional lifting result memory 123. Z105 shows a state of the two-dimensional lifting result memory 123 after two-dimensional high-pass filtering has been performed.

Figure 3:
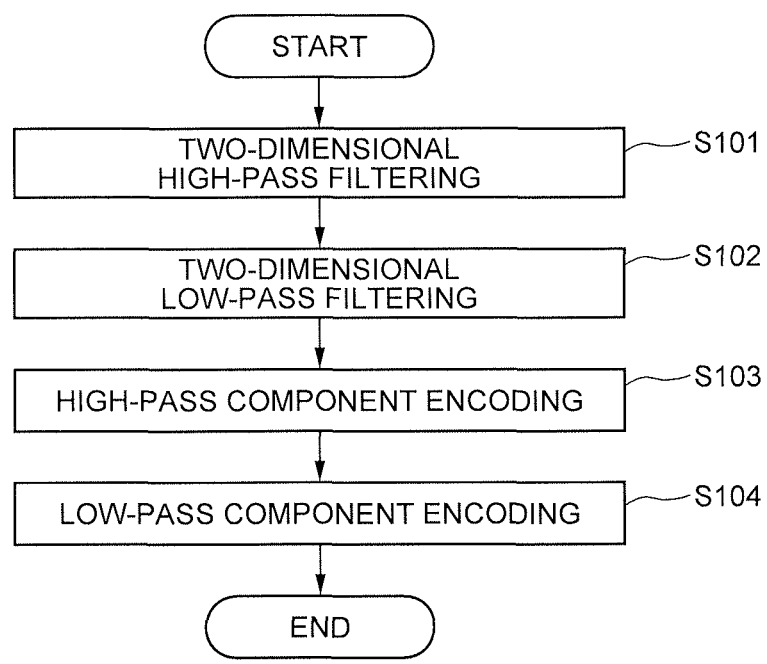
FIG. 3 is a flowchart showing encoding control of the encoding device according to the first exemplary embodiment of the present invention.

Next, the entire operation of the present embodiment will be described in detail with reference to the flowchart of FIG. 3.

When an image is input from the image input device 11 to the image memory 121, the two-dimensional high-pass filtering means 1311 reads pixel values G0 and G1 from an input image accumulated in the image memory 121, and stores coefficient values GH and pixel values G0, obtained by performing high-pass filtering, in the two-dimensional lifting intermediate memory 122 (S101).

Next, the two-dimensional low-pass filtering means 1312 reads the coefficient values GH and the pixel values G0 stored in the two-dimensional lifting intermediate memory 122, and stores coefficient values GL and GH, obtained by performing low-pass filtering, in the two-dimensional lifting result memory 123 (S102).

Then, the high-pass component encoding means 132 reads the high-pass coefficients GH stored in the two-dimensional lifting result memory 123 and encodes them, and outputs them to the code output device 14 (S103).

Finally, the low-pass component encoding means 133 reads the low-pass coefficients GL stored in the two-dimensional lifting result memory 123 and encodes them, and outputs them to the code output device 14 (S104).

While, in the above-description, the image memory 121, the two-dimensional lifting intermediate memory 122, and the two-dimensional lifting result memory 123 are shown as different memories, two-dimensional lifting operation may be performed on the same memory.

Further, while, in the above-description, the entire processes are operated by linking them in series, they may be operated in parallel.

For example, as soon as coefficient values necessary for performing two-dimensional low-pass filtering on each coordinate are acquired by the two-dimensional high-pass filtering means 1311, the two-dimensional low-pass filtering means 1312 may perform processing on such a coordinate. Further, each time a GH coefficient value of each coordinate is fixed, the high-pass component encoding means 132 may perform encoding processing on the coordinate, or each time a GL coefficient value of a coordinate is fixed, the low-pass component encoding means 133 may perform encoding processing on the coordinate.

As a specific encoding method to be used by the high-pass component encoding means 132 and the low-pass component encoding means 133, any conventional method such as JPEG 2000 can be used freely.

It should be noted that as for GL which is a low-pass component, the quantity of data can be compressed efficiently if encoding is performed together with a transform operation such as DWT (Discrete Wavelet Transform). As a major image encoding method using DWT, JPEG 2000 has been known. DWT is a type of transformation scheme which separates an input signal into a high-frequency band and a low-frequency band. Operation of DWT can be realized by two schemes, namely convolution and lifting. From viewpoints of memory consumption, velocity, and ease of invertible transformation, it is desirable to select lifting operation. An example of DWT by lifting operation is disclosed in Patent Document 1.

On the other hand, as for GH which is a high-pass component, as it is a result of extracting a high frequency, it may be encoded without any transformation operation. For example, if GH is encoded by setting the wavelet decomposition number to be 0 in JPEG 2000, the quantity of data can be compressed efficiently.

Further, when performing encoding, it is also possible to further improve the compression efficiency by adding quantization operation. In that case, as for GH which is a high-pass component, it is preferable to perform quantization at a quantization granularity which is the same as or coarser than that applied to the highest frequency component of GL which is a low-pass component.

While the present invention does not describe encoding of components other than G in the Bayer pattern, those components can be encoded freely by using a conventional method such as JPEG 2000, similar to the case of GL components.

While computation of a quarter or one eighth is performed in high-pass filtering and low-pass filtering, this can be replaced by arithmetic shift. It is also possible to use integer arithmetic, and in that case, rounding up or rounding off after the decimal point may be designed freely.

Further, while it has been described that subtraction processing is performed in high-pass filtering and addition processing is performed in low-pass filtering, it is possible to perform subtraction processing in both cases. In that case, in high-pass filtering, processing to subtract the value of each G1 pixel from a quarter of the sum of G0 pixels of neighboring four pixels is performed. In low-pass filtering, processing to subtract the value of each G0 pixel from an eight of the sum of GH coefficients of neighboring four pixels is performed. If the computation method is changed in this way, while positive and negative of the coefficient values of GH and GL are reversed with respect to the original computation method, it is possible to achieve the same advantageous effect of electric concentration.

Next, advantageous effects of the present embodiment will be described.

According to the present embodiment, it is possible to efficiently encoding G components in a Bayer pattern image.

This is because encoding is performed after electric concentration of G components is realized with use of the correlation among neighboring G components.

Further, regarding encoding of a Bayer pattern image, the present embodiment is able to provide an encoding method and an encoding device capable of efficiently removing space correlation of G components with a low load.

This is because two-dimensional high-pass filtering and low-pass filtering can be realized by easy operation among neighboring G0 pixels and G1 pixels, which provides efficient electric concentration on GL components.

Further, according to the present embodiment, it is possible to easily realize an operation in which a two-dimensional low-pass filter starts operation as soon as coefficient values necessary for computation of each coordinate in the latter-stage two-dimension low-pass filter are obtained. As such, encoding processing can be proceeded according to an input of a pixel in a scan line direction, without holding the input pixel in a memory for a long time. It should be noted that when pixel scanning is performed in a diagonal direction against a Bayer pattern image, as G0 and G1 are arrayed in the pixel scanning direction and an orthogonal direction thereto, by applying encoding such as JPEG 2000 to a two-dimensional signal configured of G0 and G1 obtained in this manner, the compression efficiency can be improved by using the correlation between G0 and G1. However, in this method (hereinafter referred to as a diagonal scanning method), there is a problem that a memory access load increases. This means that in general, a lifting operation in a direction not conforming to the scanning direction of an image signal has a high memory access load, whereby it is difficult to perform at a high speed. Even in general lifting in a horizontal direction and a vertical direction, as a lifting operation in a vertical direction has lower memory access locality compared with an operation in a horizontal direction (scanning line direction), it is difficult to perform the operation at a high-speed. In the diagonal scanning method, such a lifting operation having a high load must be performed twice.

Second Exemplary Embodiment

Next, a second exemplary embodiment of the present invention will be described in detail with reference to the drawings. The present embodiment corresponds to the decoding device of the first exemplary embodiment of the present invention.

Figure 4:
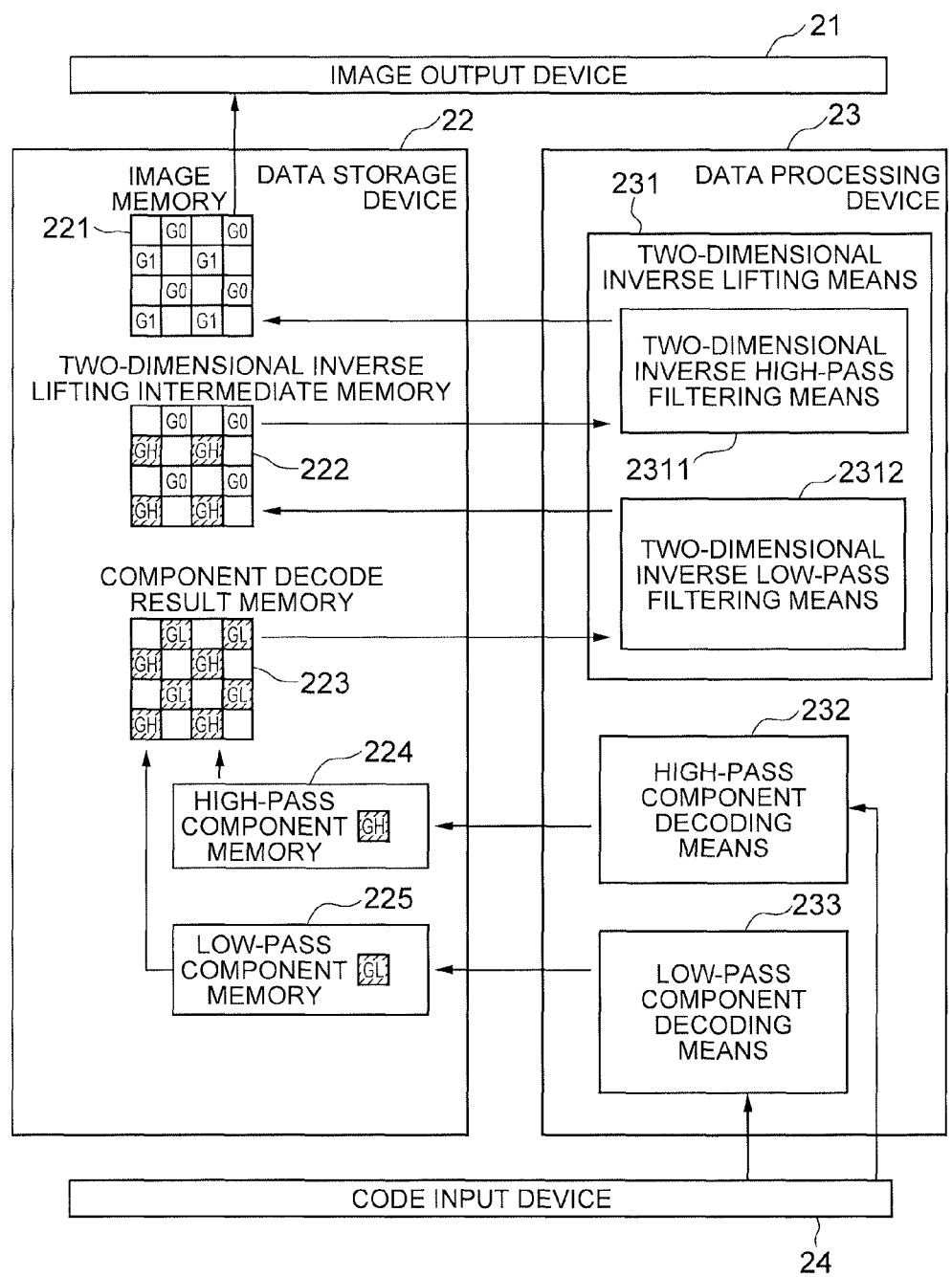
FIG. 4 is a block diagram showing a schematic configuration of a decoding device according to a second exemplary embodiment of the present invention.

Referring to FIG. 4, the second exemplary embodiment of the present invention includes an image output device 21, a data storage device 22, a data processing device 23 to be operated by program control, and a code input device 24.

The code input device 24 is a device which inputs codes to be decoded, and is configured of a magnetic disk device, a communication device, or the like, for example.

The data storage device 22 includes an image memory 221, a two-dimensional inverse lifting intermediate memory 222, a component decode result memory 223, a high-pass component memory 224, and a low-pass component memory 225.

The low-pass component memory 225 is an intermediate memory which holds decoded GL coefficients among coefficient values which should be output to the component decode result memory 223.

The high-pass component memory 224 is an intermediate memory which holds decoded GH coefficients among coefficient values which should be output to the component decode result memory 223.

The component decode result memory 223 holds the coefficient values of decoded high-pass components GH and decoded low-pass components GL.

The two-dimensional inverse lifting intermediate memory 222 holds coefficients obtained by performing two-dimensional inverse low-pass filtering on a decoded image stored in the component decode result memory 223.

The image memory 221 holds an image which should be output to the image output device 21.

The image output device 21 is configured of a display device, for example, and reads and outputs pixel data stored in the image memory 221.

The data processing device 23 includes a two-dimensional inverse lifting means 231, a high-pass component decoding means 232, and a low-pass component decoding means 233. Further, the two-dimensional inverse lifting means 231 includes a two-dimensional inverse high-pass filtering means 2311, and a two-dimensional inverse low-pass filtering means 2312.

The low-pass component decoding means 233 decodes codes input from the code input device 24, and stores them in the component decode result memory 223 via the low-pass component memory 225.

The high-pass component decoding means 232 decodes codes input from the code input device 24, and stores them in the component decode result memory 223 via the high-pass component memory 224.

The two-dimensional inverse low-pass filtering means 2312 included in the two-dimensional inverse lifting means 231 reads coefficient values GH and GL stored in the component decode result memory 223, and stores pixel values G0 and coefficient values GH, obtained by performing inverse low-pass filtering, in the two-dimensional lifting intermediate memory 222.

Performing inverse low-pass filtering means performing processing to subtract one eighth of the sum of the GH coefficients of neighboring four pixels from the value of each GL pixel.

The two-dimensional inverse high-pass filtering means 2311 included in the two-dimensional inverse lifting means 231 reads coefficient values GH and pixel values G0 accumulated in the two-dimensional inverse lifting intermediate memory 222, and stores pixel values G0 and G1, obtained by performing inverse high-pass filtering, in the image memory 221.

Performing inverse high-pass filtering means performing processing to add a quarter of the sum of the G0 pixels of neighboring four pixels to the value of each GH coefficient.

Figure 5:
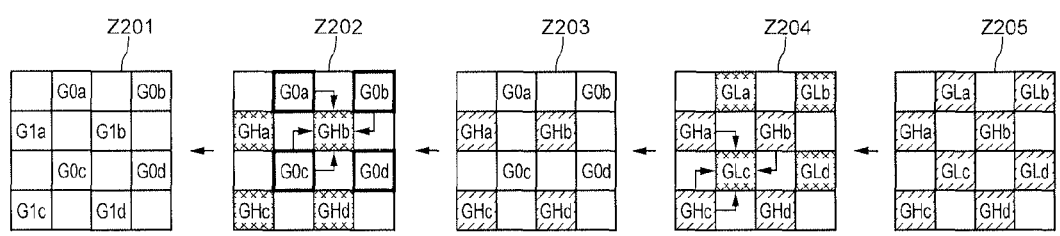
FIG. 5 is an illustration schematically showing an operation of a two-dimensional inverse lifting means of the decoding device according to the second exemplary embodiment of the present invention.

FIG. 5 shows a specific example of an operation of the two-dimensional inverse lifting means 231.

Z205 shows an arrangement of GL and GH coefficients of a decoded image accumulated in the component decode result memory 223. The decoded image has 4*4 pixels, and a color filter array is formed in block units of 2*2 pixels, whereby an image consists of four blocks. In Z205, four blocks are indicated by "a", "b", "c", and "d", and GL and GH coefficients in the block "a" are shown in the form of GLa and GHa, for example.

Z204 shows a state of operation of the two-dimensional inverse low-pass filtering means 2312. The two-dimensional inverse low-pass filtering means 2312 performs processing to subtract one eighth of the sum of the neighboring GH coefficients on each of the coefficients GLa, GLb, GLc, and GLd. For example, the two-dimensional inverse low-pass filtering means 2312 performs processing to subtract one eighth of the sum of GHa, GHb, GHc, and GHd from GLc. The two-dimensional inverse low-pass filtering means 2312 performs similar processing on each of G0a, G0b, and G0d. If there are not four neighboring coefficients GH within the image region, other GH coefficient values within the image region may be used. In the case of GLa, for example, while GHa and GHb are present on the bottom side, there is no GH coefficient on the top side. In that case, processing may be performed on the assumption that GHa and GHb are also present on the top side. As a result of processing, the coefficient values of GLa, GLb, GLc, and GLd of the input image are replaced by pixel values of G0a, G0b, G0c, and G0d, respectively, and are stored in the two-dimensional inverse lifting intermediate memory 222. Z203 shows a state of the two-dimensional inverse lifting intermediate memory 222 after two-dimensional inverse low-pass filtering has been performed.

Z202 shows a state of operation of the two-dimensional inverse high-pass filtering means 2311. The two-dimensional inverse high-pass filtering means 2311 performs processing to add a quarter of the sum of the neighboring G0 pixels on each of the coefficients GHa, GHb, GHc, and GHd. For example, the two-dimensional high-pass filtering means 1311 performs processing to add a quarter of the sum of GHa, GHb, GHc, and GHd to GHb. The two-dimensional inverse high-pass filtering means 2311 performs similar processing on each of G1a, G1c, and G1d. If there are not four neighboring pixels G0 within the image region, other G0 pixel values within the image region may be used. In the case of GHa, for example, while the G0a and G0c are present on the right side, there is no G0 pixel on the left side. In that case, processing may be performed on the assumption that G0a and G0c are also present on the left side. As a result of processing, the coefficient values of GHa, GHb, GHc, and GHd of the input image are replaced by the coefficient values of G0a, G0b, G0c, and G0d, respectively, and are stored in the image memory 221. Z201 shows a state of the image memory 221 after two-dimensional inverse high-pass filtering has been performed.

Figure 6:
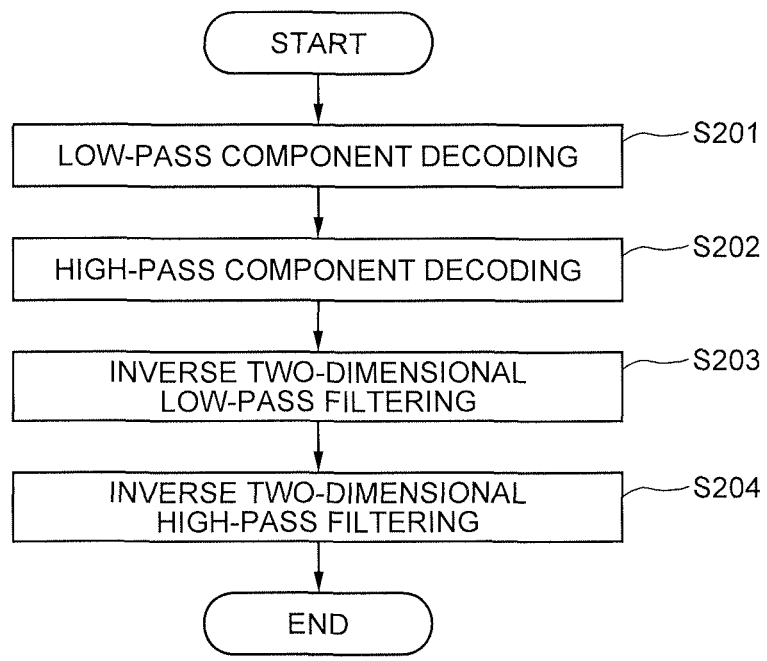
FIG. 6 is a flowchart showing decoding control of the decoding device according to the second exemplary embodiment of the present invention.

Next, the entire operation of the present embodiment will be described in detail with reference to the flowchart of FIG. 6.

First, the low-pass component decoding means 233 decodes low-pass coefficients GL input from the code input device, and stores them in the component decode result memory 223 via the low-pass component memory 225 (S201).

Next, the high-pass component decoding means 232 decodes high-pass coefficients GH input from the code input device, and stores them in the component decode result memory 223 via the high-pass component memory 224 (S202).

Then, the two-dimensional inverse low-pass filtering means 2312 reads the coefficient values GH and GL stored in the component decode result memory 223, and stores pixel values G0 and coefficient values GH, obtained by performing inverse low-pass filtering, in the two-dimensional lifting intermediate memory 222 (S203).

Finally, the two-dimensional inverse high-pass filtering means 2311 reads the coefficient values GH and the pixel values G0 accumulated in the two-dimensional inverse lifting intermediate memory 222, and stores the pixel values G0 and G1, obtained by performing inverse high-pass filtering, in the image memory 221 (S204).

While, in the above-description, the image memory 221, the two-dimensional inverse lifting intermediate memory 222, and the component decode result memory 223 are shown as different memories, two-dimensional inverse lifting operation may be performed on the same memory.

Further, while, in the above-description, the entire processes are operated by linking them in series, they may be operated in parallel.

For example, as soon as coefficient values necessary for performing two-dimensional inverse high-pass filtering on each coordinate are acquired by the two-dimensional inverse low-pass filtering means 2312, the two-dimensional inverse high-pass filtering means 2311 may perform processing on such a coordinate. Further, an image may be output to the image output device 21 each time G0 and G1 pixel values of each coordinate are fixed.

A specific encoding method to be used by the high-pass component decoding means 232 and the low-pass component decoding means 233 may be designed freely including any conventional methods, as the case of the first exemplary embodiment. This is also applied to encoding of components other than G.

While computation of a quarter or one eighth is performed in inverse high-pass filtering and in inverse low-pass filtering, this can be replaced by an arithmetic shift. It is also possible to use integer arithmetic, and in that case, as for the method of rounding up or rounding off after the decimal point, by using the same method as that used for encoding, it is possible to realize a reversible operation.

Further, while it has been described that addition processing is performed in inverse high-pass filtering and subtraction processing is performed in inverse low-pass filtering, it is possible to perform subtraction processing in both cases. This can be used in the case where the encoding specification is subtraction processing in both high-pass filtering and low-pass filtering. In that case, in inverse high-pass filtering, processing to subtract the value of each G1 pixel from a quarter of the sum of the G0 pixels of neighboring four pixels is performed. In inverse low-pass filtering, processing to subtract the value of each G0 pixel from one eighth of the sum of the GH coefficients of neighboring four pixels is performed. In the case of changing the computation method in this way, each filtering at the time of encoding and each filtering at the time of decoding are the same operation, which provides an effect that the circuit design of the device can be shared.

The present embodiment corresponds to a decoding device for data encoded in the first exemplary embodiment. In encoding of a Bayer pattern image, the present embodiment has an advantageous effect of providing an encoding method and an encoding device capable of efficiently removing spatial correlation of G components with a low load.

Further, according to the present embodiment, it is possible to easily realize an operation in which a two-dimensional inverse low-pass filter starts operation as soon as coefficient values necessary for computation of each coordinate by the latter-stage two-dimension inverse low-pass filter are obtained. As such, decode processing can be proceeded according to an input of a code in a scan line direction, without holding the decode coefficients in a memory for a long time.

Third Exemplary Embodiment

Figure 7:
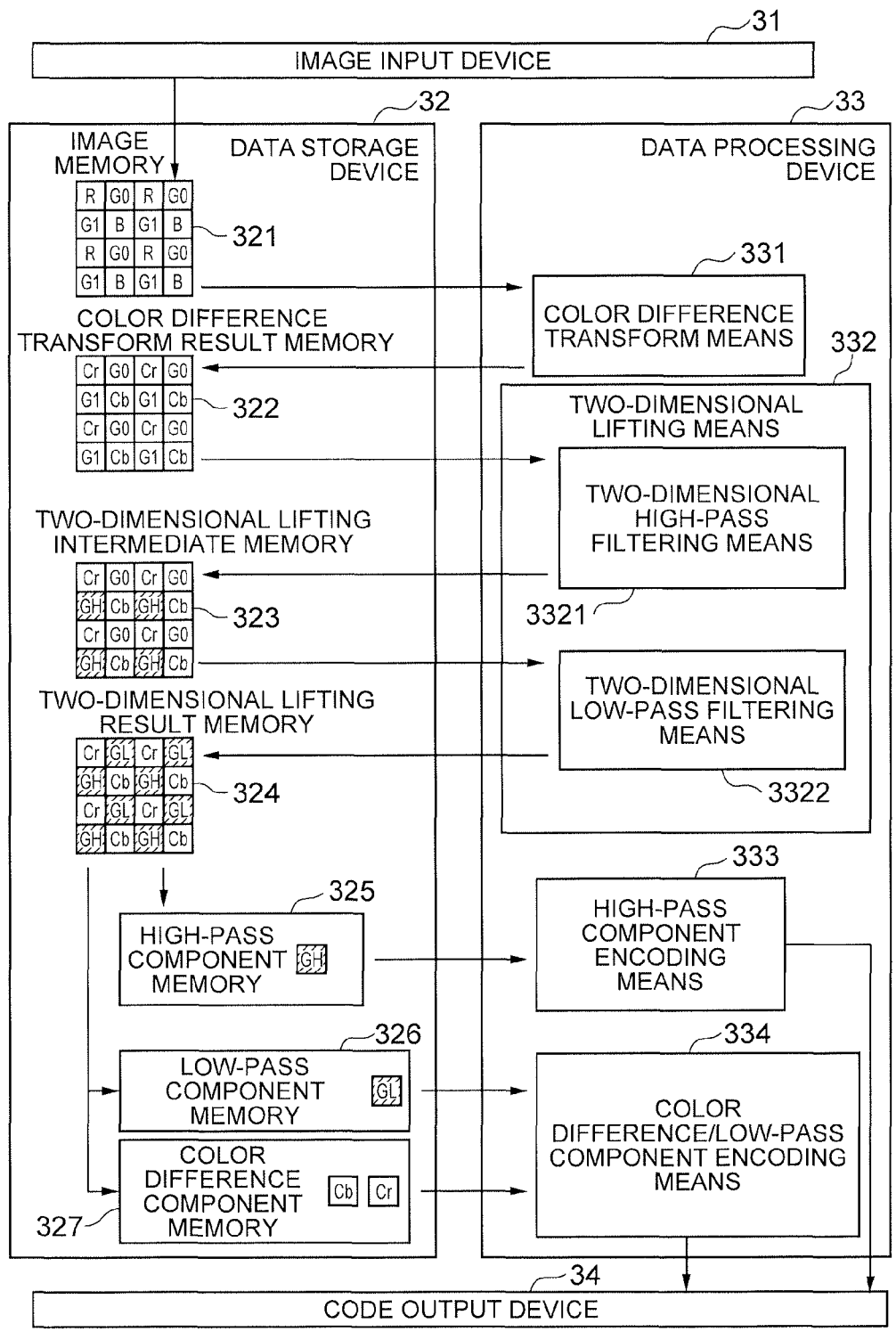
FIG. 7 is a block diagram showing a schematic configuration of an encoding device according to a third exemplary embodiment of the present invention.

Referring to FIG. 7, a third exemplary embodiment of the present invention includes an image input device 31, a data storage device 32, a data processing device 33 to be operated by program control, and a code output device 34.

The image input device 31 and the code output device 34 are the same as the image input device 11 and code output device 14 shown in FIG. 1 of the first exemplary embodiment.

The data storage device 32 includes an image memory 321, a color difference transform result memory 322, a two-dimensional lifting intermediate memory 323, a two-dimensional lifting result memory 324, a high-pass component memory 325, a low-pass component memory 326, and a color difference component memory 327.

The image memory 321, the two-dimensional lifting intermediate memory 323, the two-dimensional lifting result memory 324, the high-pass component memory 325, and the low-pass component memory 326 are the same as the image memory 121, the two-dimensional lifting intermediate memory 122, the two-dimensional lifting result memory 123, the high-pass component memory 124, and the low-pass component memory 125 shown in FIG. 1 of the first exemplary embodiment.

The color difference transform result memory 322 stores a color difference transformed image obtained by performing color different transform on an input image stored in the image memory 321.

The color difference component memory 327 is an intermediate memory storing results of extracting only Cb and Cr components, which become color difference components, of the two-dimensional lifting result memory 324.

The data processing device 33 includes a color difference transform means 331, a two-dimensional lifting means 332, a high-pass component encoding means 333, and a color difference and low-pass component encoding means 334. The two-dimensional lifting means 332 includes a two-dimensional high-pass filtering means 3321 and a two-dimensional low-pass filtering means 3322.

The two-dimensional lifting means 332, the two-dimensional high-pass filtering means 3321, and the two-dimensional low-pass filtering means 3322 are the same as the two-dimensional lifting means 131, the two-dimensional high-pass filtering means 1311, and the two-dimensional low-pass filtering means 1312 shown in FIG. 1 of the first exemplary embodiment.

The color difference transform means 331 performs color-difference transform on an input image stored in the image memory 321, and stores the obtained color difference transformed image in the color difference transform result memory 322.

The color difference and low-pass component encoding means 334 reads, via the low-pass component memory 326 and the color difference component memory 327, and encodes low-pass coefficients GL and color difference components Cb and Cr stored in the two-dimensional lifting result memory 324, and outputs them to the code output device 34.

Figure 8:
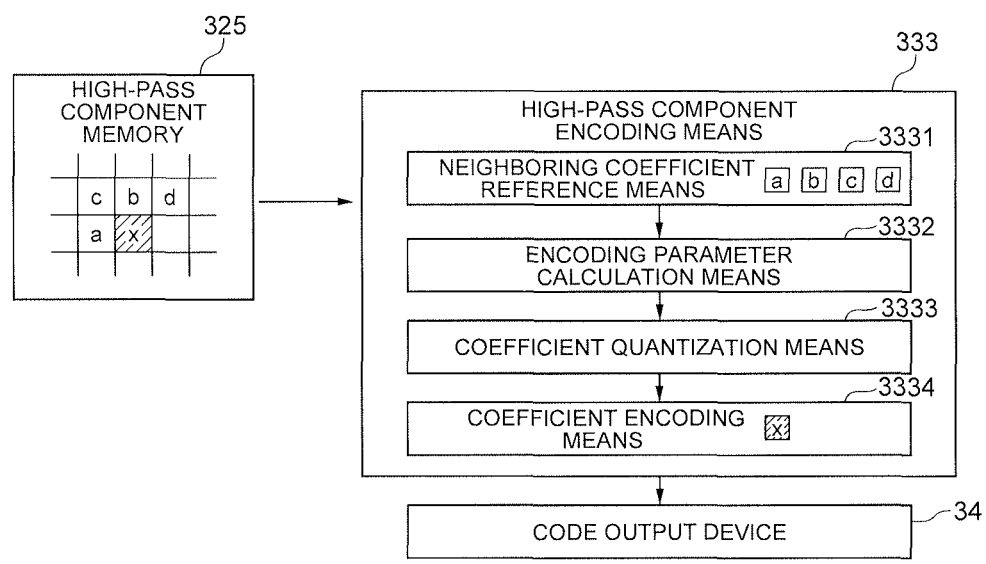
FIG. 8 is a block diagram showing a configuration of a high-pass component encoding means of the encoding device according to the third exemplary embodiment of the present invention.

FIG. 8 shows the configuration of the high-pass component encoding means 333.

Referring to FIG. 8, the high-pass component encoding means 333 includes a neighboring coefficient reference means 3331, an encoding parameter calculation means 3332, a coefficient quantization means 3333, and a coefficient encoding means 3334.

The neighboring coefficient reference means 3331 reads neighboring encoded high-pass coefficients from the high-pass component memory 325. Specifically, the neighboring coefficient reference means 3331 reads GH coefficients positioned at space coordinates of left (a), top (b), top left (c), and top right (d), with respect to a GH coefficient (x) to be encoded, from the high-pass component memory 325 only containing GH coefficients. Further, on the readout coefficients a, b, c, and d, the neighboring coefficient reference means 3331 performs quantization processing and inverse quantization processing, to thereby reproduce values which are the same as the coefficient values to be obtained when decoded.

For quantization and inverse quantization operation, typical midtread quantization with a dead zone is used.

The encoding parameter calculation means 3332 calculates the sum of the absolute values of the coefficients a, b, c, and d, and further, quantizes the sum value, to thereby calculate an encoding parameter. In the processing of quantizing the sum value, first, the encoding parameter calculation means 3332 quantizes the sum value at a granularity which is the same as the quantization granularity applied to the coefficient values. Then, the encoding parameter calculation means 3332 performs arithmetic right shift by 3 bits on the quantized sum value, and takes the number of significant figures in the binary representation of the shifted value as an encoding parameter k.

The coefficient quantization means 3333 reads the GH coefficient (x) to be quantized from the high-pass component memory 325 and quantizes it.

The coefficient encoding means 3334 performs Golomb-Rice encoding on the quantized coefficient with use of the parameter k. If the absolute value is nonzero, after the Golomb-Rice encoding, the coefficient encoding means 3334 outputs positive/negative information of the coefficient value in 1 bit.

Figure 9:
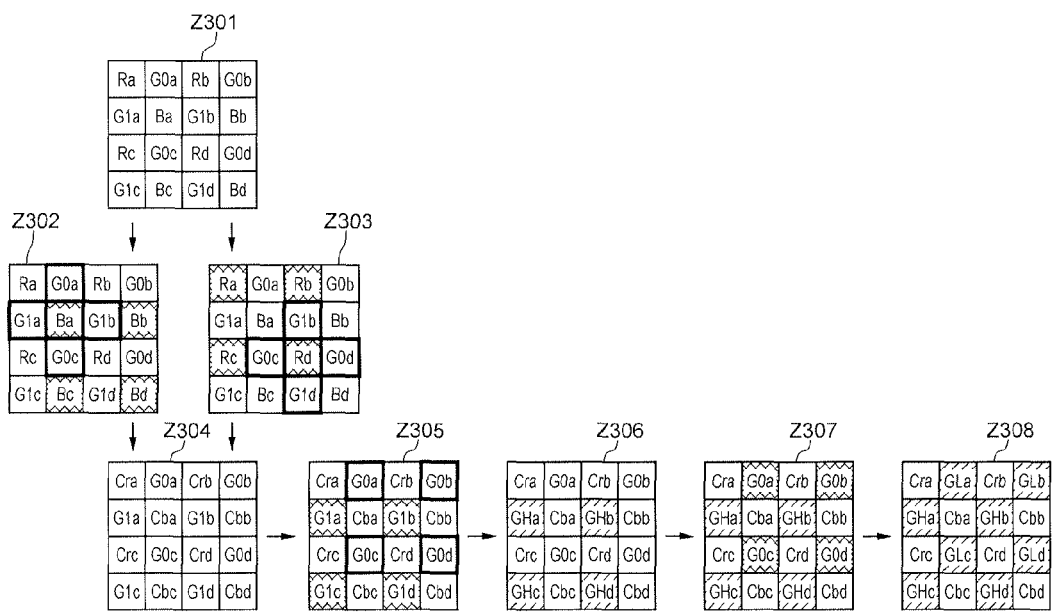
FIG. 9 is an illustration schematically showing operations of a color difference transform means and a two-dimensional lifting means of the encoding device according to the third exemplary embodiment of the present invention.

FIG. 9 shows specific examples of operations of the color difference transform means 331 and the two-dimensional lifting means 332.

Z301 shows an arrangement of G0, G1, R, and B pixels in an input image accumulated in the image memory 321. The input image has 4*4 pixels, and a color filter array is formed in block units of 2*2 pixels, whereby the image consists of four blocks. In Z301, four blocks are indicated by "a", "b", "c", and "d", and G0, G1, R, and B pixels in the block "a" are shown in the form of G0a, G1a, Ra, and Ba, for example.

Z302 and Z303 show states of operation of the color difference transform means 331. The color difference transform means 331 performs processing to subtract a quarter of the sum of the neighboring G0 and G1 pixels on each of Ba, Bb, Bc, Bd, Ra, Rb, Rc, and Rd, which are color components other than G. For example, the color difference transform means 331 performs processing to subtract a quarter of the sum of G0a, G1a, G1b, and G0c from Ba. The color difference transform means 331 performs similar processing on each of Bb, Bc, Bd, Ra, Rb, Rc, and Rd. If there are not four neighboring G0 and G1 pixels within the image region, other G0 and G1 pixel values within the image region may be used. In the case of Ra, for example, while G0a and G1a are present on the right and the bottom, there are no G0 and G1 pixels on the left and the top. In that case, processing may be performed on the assumption that G0a and G1a are also present on the left and the top. As a result of processing, the pixel values of Ba, Bb, Bc, Bd, Ra, Rb, Rc, and Rd of the input image are replaced by color difference values of Cba, Cbb, Cbc, Cbd, Cra, Crb, Crc, and Crd, respectively, and are stored in the color difference transform result memory 322. Z304 shows a state of the color difference transform result memory 322 after the color difference transform has been performed.

Z304 to Z308 show states of the operation of the two-dimensional lifting means 332. With respect to the G0 and G1 pixels in Z304, the same processing as that of Z101 to Z105 is performed. Z308 shows a state of the two-dimensional lifting result memory 324 after the two-dimensional lifting has been performed.

Figure 10:
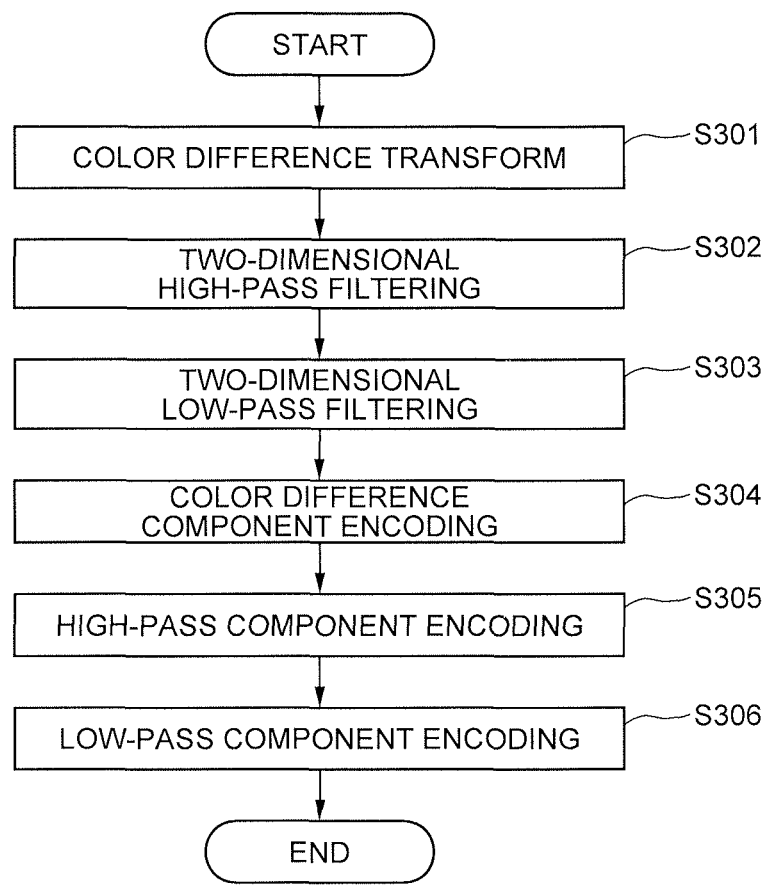
FIG. 10 is a flowchart showing encoding control of the encoding device according to the third exemplary embodiment of the present invention.

Next, the entire operation of the present embodiment will be described in detail with reference to the flowchart of FIG. 10.

When an image is input from the image input device 31 to the image memory 321, the color difference transform means 331 performs color difference transform on the input image stored in the image memory 321, and stores the obtained color difference transformed image in the color difference transform result memory 322 (S301).

Next, the two-dimensional high-pass filtering means 3321 reads the pixel values G0 and G1 from the input image accumulated in the color difference transform result memory 322, and stores the coefficient values GH and the pixel values G0 obtained by performing high-pass filtering, in the two-dimensional lifting intermediate memory 323 (S302).

Then, the two-dimensional low-pass filtering means 3322 reads the coefficient values GH and the pixel values G0 stored in the two-dimensional lifting intermediate memory 323, and stores the coefficient values GL and GH, obtained by performing low-pass filtering, in the two-dimensional lifting result memory 324 (S303).

Then, the color difference and low-pass component encoding means 334 reads the color component values Cb and Cr stored in the two-dimensional lifting result memory 324, performs encoding on the respective two-dimensional signals of Cb and Cr, and outputs them to the code output device 34 (S304).

Then, the high-pass component encoding means 333 reads the high-pass coefficients GH stored in the two-dimensional lifting result memory 324 and encodes them, and outputs them to the code output device 34 (S305).

Finally, the color difference and low-pass component encoding means 334 reads the low-pass coefficients GL and the color component values Cb and Cr and encodes them, and outputs them to the code output device 34 (S306).

Figure 11:
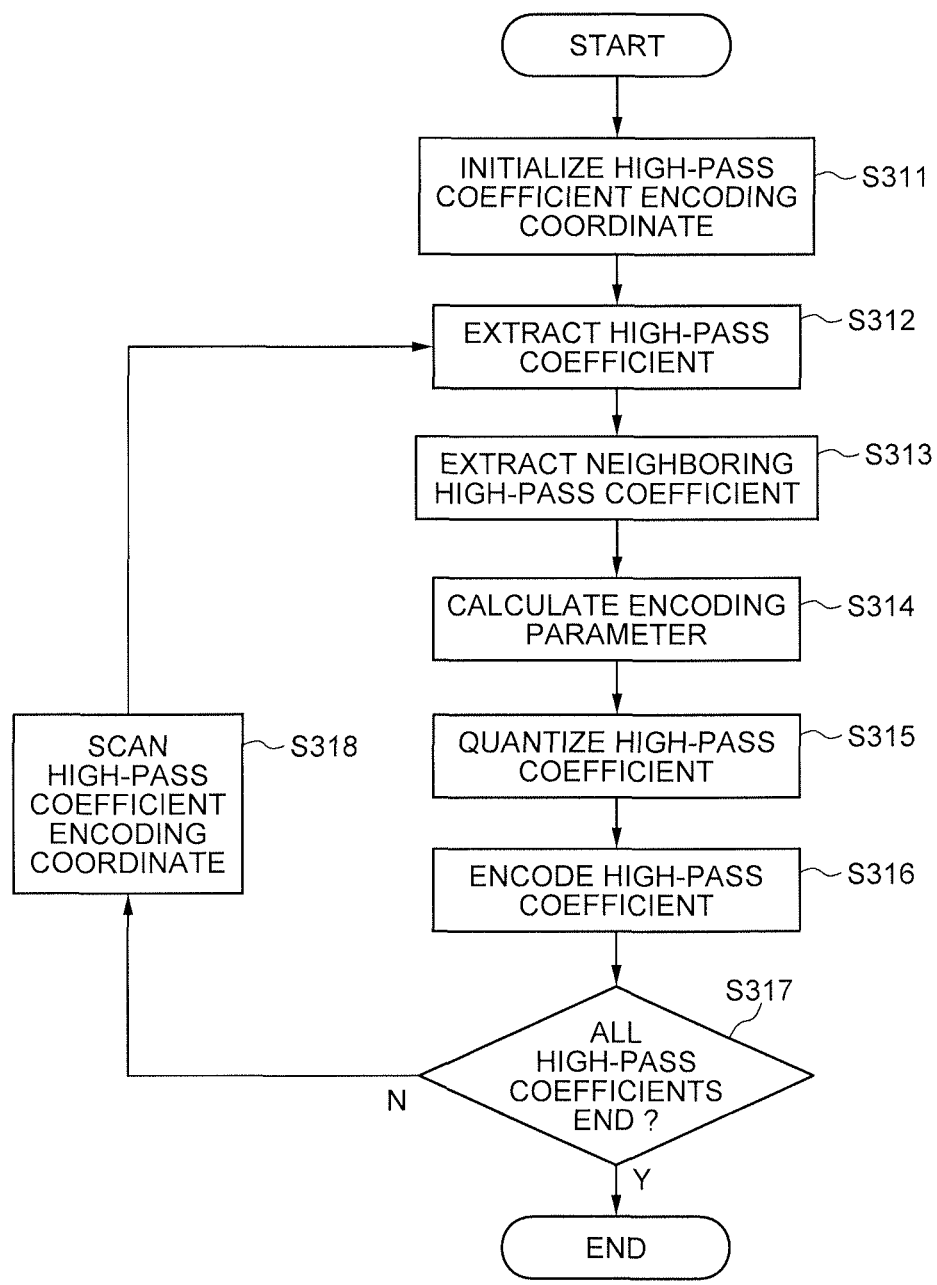
FIG. 11 is a flowchart showing high-pass component encoding control of the encoding device according to the third exemplary embodiment of the present invention.

Next, operation of the high-pass component encoding means 333 of the present embodiment will be described in detail with reference to the flowchart of FIG. 11.

First, the high-pass component encoding means 333 initializes the encoding coordinate of the high-pass coefficient to the origin (0,0) (S311).

Next, the high-pass component encoding means 333 reads the high-pass coefficient at the current encoding coordinate from the high-pass component memory 325 (S312).

Then, the neighboring coefficient reference means 3331 reads the neighboring encoded high-pass coefficients from the high-pass component memory 325 (S313). Specifically, the neighboring coefficient reference means 3331 reads GH coefficients positioned at space coordinates of left (a), top (b), top left (c), and top right (d) with respect to the GH coefficient (x) to be encoded, from the high-pass component memory 325 only containing GH coefficients. Further, on the readout coefficients a, b, c, and d, the neighboring coefficient reference means 3331 performs quantization and inverse quantization processing, to thereby reproduce values which are the same as the coefficient values to be obtained when decoded.

Then, the encoding parameter calculation means 3332 calculates the sum of the absolute values of the coefficients a, b, c, and d, and further, quantizes the sum value, to thereby calculate an encoding parameter (S314). In the quantization processing of the sum value, first, the encoding parameter calculation means 3332 quantizes the sum value at a granularity which is the same quantization granularity applied to the coefficient values. Then, the encoding parameter calculation means 3332 performs arithmetic right shift by 3 bits on the quantized sum value, and takes the number of significant figures in the binary representation of the shifted value as an encoding parameter k.

Then, the coefficient quantization means 3333 quantizes the GH coefficient to be encoded (S315).

Then, the coefficient encoding means 3334 performs Golomb-Rice encoding on the absolute value of the quantized coefficient by using the parameter k (S316). If the absolute value is nonzero, after the Golomb-Rice encoding, the coefficient encoding means 3334 outputs positive/negative information of the coefficient value in 1 bit.

Then, the high-pass component encoding means 333 determines whether encoding of all high-pass coefficients has been completed (S317), and if not, the high-pass component encoding means 333 changes the encoding coordinates (S318), and returns to step S312. If encoding of all high-pass coefficients has been completed, the processing ends.

While, in the above description, computation of a color difference is performed by computing a difference between the average value of neighboring G components of four pixels and R and B values, it is also acceptable to calculate a difference between a value, obtained by multiplexing the average value of G components of four pixels by a certain value, and R and B values.

Further, while, in the above description, color difference components and low-pass components are encoded by the same encoder, it is also possible to use different encoders and different encoding methods for color difference components and low-pass components, respectively.

Further, while, in the above-description, the entire processes are operated by linking them in series, they may be operated in parallel.

For example, as soon as pixel values necessary for performing color difference transform on each coordinate are input, the color difference transform means 331 may perform processing on such a coordinate.

Further, the sequence of encoding color difference components and GH and GL components may be set freely. For example, in order to reduce the buffer capacity in the encoding device, it is effective to perform encoding in the sequence of calculation in the encoding process, that is, to perform encoding in the sequence of color difference, GH, and GL. On the other hand, in order to give priority to reduction of the buffer capacity in the decoding device, it is preferable to perform encoding in the operational sequence in the decoding process, that is, to perform encoding in the sequence of GL, GH, and color difference.

As variable-length encoding, it is possible to use static Huffman codes rather than Golomb-Rice codes, of course. In that case, the neighboring coefficient reference means 3331 may calculate an encoding parameter k by performing quantization on the sum of the absolute values of neighboring coefficients, and the coefficient encoding means 3334 may perform encoding of the coefficients while switching between multiple types of Huffman code tables according to the value of the encoding parameter k.

Further, while, in the above description, quantization is performed constantly in order to improve the compressibility of high-pass coefficients, it is also possible to perform reversible compression and extension with a configuration in which quantization and inverse quantization are not performed.

According to the present embodiments, the following advantageous effects can be achieved, besides the same advantageous effects as those of the first exemplary embodiment.

According to the present embodiment, by performing color difference transform on color components other than G, it is possible to reduce the electricity included in the color components so as to improve the compression efficiency.

Encoding of color difference components is performed on each of the two-dimensional signals configured of each of the color difference components. Specifically, encoding is performed on a grayscale image of Cb and a grayscale image of Cr, respectively. As such, an RGB image will not be generated intermediately, whereby high memory efficiency can be kept.

Further, as color transform processing can be performed simultaneously on the memory used for two-dimensional lifting, high memory efficiency can be kept.

Further, in the present embodiment, as encoding of high-pass components can be performed in the sequence of scan lines each time a GH coefficient is generated, a buffer memory necessary for encoding can be maintained at a smaller level, compared with other methods such as JPEG 2000.

Further, by using Golomb-Rice codes, having a shorter code length as it is closer to 0, for encoding high-pass components, it is possible to efficiently encode high-pass components in which values around 0 appear frequently. At that time, by estimating an encoding parameter from the encoded neighboring coefficients with high accuracy, more efficient compression can be realized.

Fourth Exemplary Embodiment

Next, a fourth exemplary embodiment of the present invention will be described in detail with reference to the drawings. The present embodiment corresponds to the decoding device of the third exemplary embodiment of the present invention.

Figure 12:
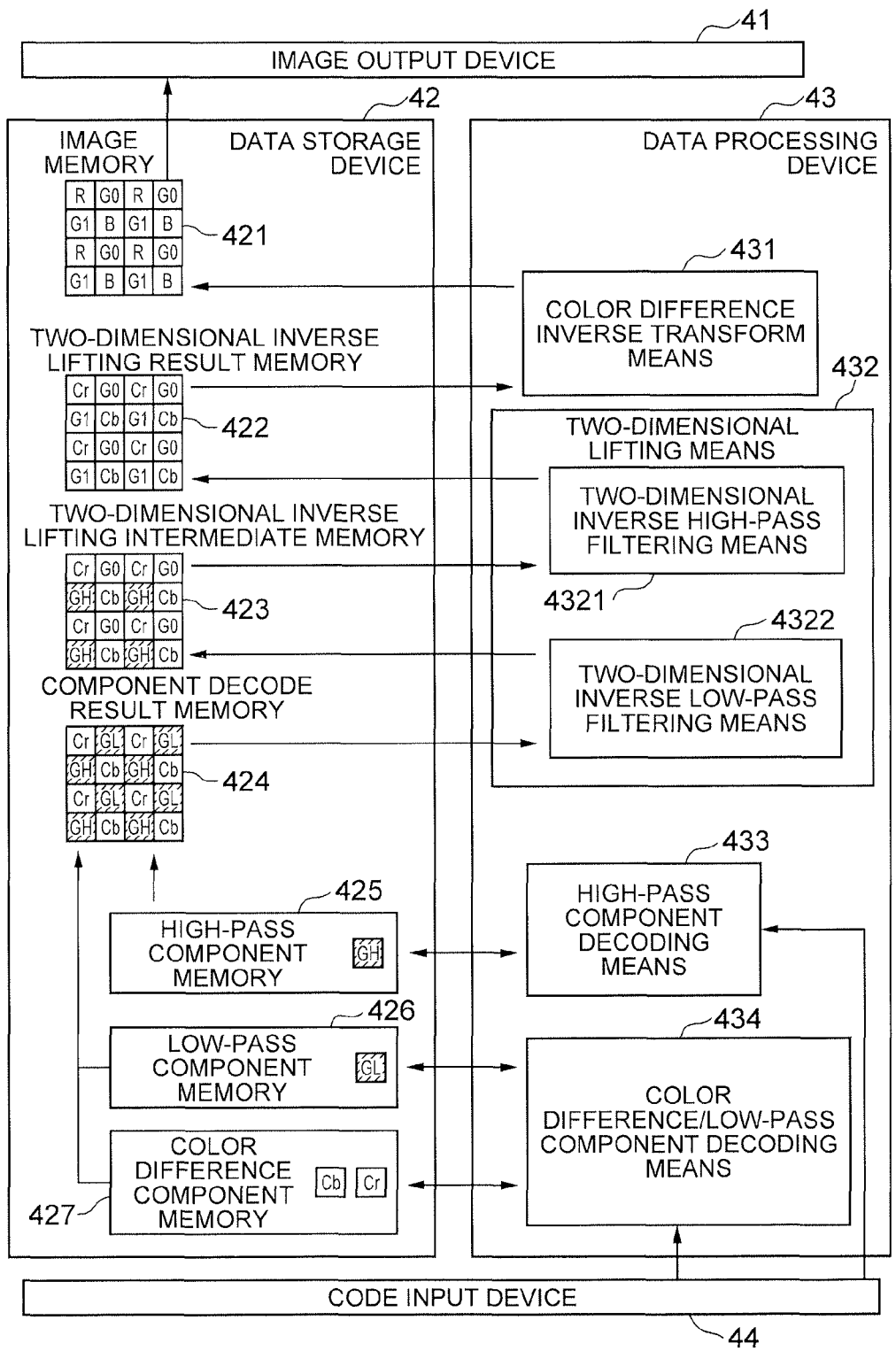
FIG. 12 is a block diagram showing a schematic configuration of a decoding device according to a fourth exemplary embodiment of the present invention.

Referring to FIG. 12, a fourth exemplary embodiment of the present invention includes an image output device 41, a data storage device 42, a data processing device 43 to be operated by program control, and a code input device 44.

The code input device 44 and the image output device 41 are the same as the code input device 24 and the code output device 21 shown in FIG. 4 of the second exemplary embodiment.

The data storage device 42 includes an image memory 421, a two-dimensional inverse lifting result memory 422, a two-dimensional inverse lifting intermediate memory 423, a component decode result memory 424, a high-pass component memory 425, a low-pass component memory 426, and a color difference component memory 427.

The image memory 421, the two-dimensional inverse lifting result memory 422, the two-dimensional inverse lifting intermediate memory 423, the high-pass component memory 425, and the low-pass component memory 426 are the same as the image memory 221, the two-dimensional inverse lifting intermediate memory 222, the high-pass component memory 224, and the low-pass component memory 225 shown in FIG. 4 of the second exemplary embodiment.

The component decode result memory 424 holds coefficient values of decoded high-pass components GH and low-pass components GL, and color difference components Cb and Cr.

The color difference component memory 427 is an intermediate memory which holds decoded Cb and Cr components among the coefficient values which should be output to the component decode result memory 424.

The data processing device 43 includes a color difference inverse transform means 431, a two-dimensional inverse lifting means 432, a high-pass component decoding means 433, and a color difference and low-pass component decoding means 434. The two-dimensional lifting means 432 includes a two-dimensional inverse high-pass filtering means 4321 and a two-dimensional inverse low-pass filtering means 4322.

The two-dimensional inverse lifting means 432, the two-dimensional inverse high-pass filtering means 4321, and the two-dimensional inverse low-pass filtering means 4322 are the same as the two-dimensional inverse lifting means 231, the two-dimensional inverse high-pass filtering means 2311, and the two-dimensional inverse low-pass filtering means 2312 shown in FIG. 4 of the second exemplary embodiment.

The color difference and low-pass component decoding means 434 decodes low-pass coefficients GL and color difference components Cb and Cr from codes input from the code input device 44, and stores them in the component decode result memory 424 via the low-pass component memory 426 and the color difference component memory 427, respectively.

The high-pass component decoding means 433 decodes codes input from the code input device 44, and stores them in the component decode result memory 424 via the high-pass component memory 425.

The color difference inverse transform means 431 performs color difference inverse transform on an image stored in the two-dimensional inverse lifting result memory 422, and stores the obtained image in the image memory 421.

Figure 13:
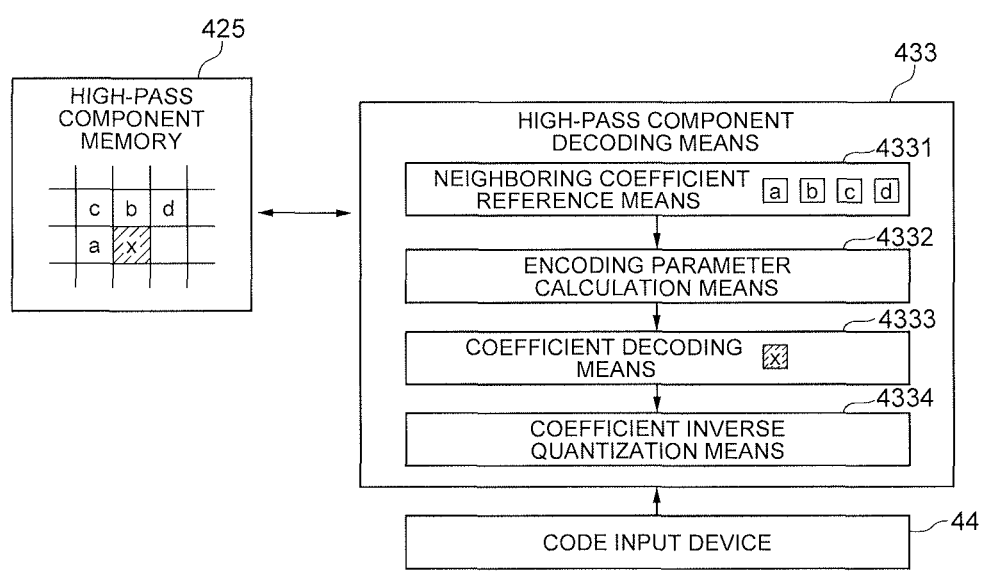
FIG. 13 is a block diagram showing a configuration of a high-pass component decoding means of the decoding device according to the fourth exemplary embodiment of the present invention.

FIG. 13 shows the configuration of the high-pass component decoding means 433.

Referring to FIG. 13, the high-pass component decoding means 433 includes a neighboring coefficient reference means 4331, an encoding parameter calculation means 4332, a coefficient decoding means 4333, and a coefficient inverse quantization means 4334.

The neighboring coefficient reference means 4331 reads neighboring decoded high-pass coefficients from the high-pass component memory 425. Specifically, the neighboring coefficient reference means 4331 reads GH coefficients positioned at the space coordinates of left (a), top (b), top left (c), and top right (d), with respect to a GH coefficient (x) to be decoded, from the high-pass component memory 425 containing only GH coefficients.

The encoding parameter calculation means 4332 calculates the sum of the absolute values of the coefficients a, b, c, and d, and further, quantizes the sum value to thereby calculate an encoding parameter. In the processing of quantizing the sum value, the encoding parameter calculation means 4332 first quantizes the sum value at the same granularity as the quantization granularity applied to the coefficient values. Then, the encoding parameter calculation means 4332 performs arithmetic right shift by 3 bits on the quantized sum value, and takes the number of significant figures in the binary representation of the shifted value as an encoding parameter k.

The coefficient decoding means 4333 performs Golomb-Rice decoding on the absolute value of the quantized coefficient by using the parameter k. If the absolute value is non-zero, after the Golomb-Rice decoding, the coefficient decoding means 4333 outputs positive/negative information of the coefficient value in 1 bit.

The coefficient inverse quantization means 4334 inversely quantizes the decoded coefficient value, and outputs it to the high-pass component memory 425.

Figure 14:
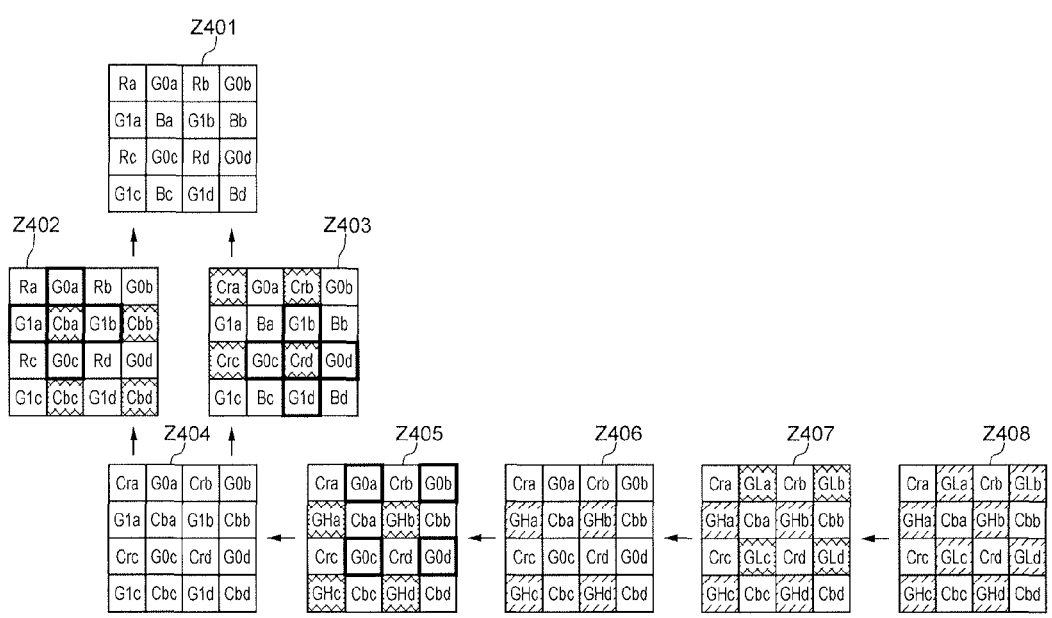
FIG. 14 is an illustration schematically showing operations of a color difference inverse transform means and a two-dimensional inverse lifting means of the decoding device according to the fourth exemplary embodiment of the present invention.

FIG. 14 shows specific examples of operations of the color difference inverse transform means 431 and the two-dimensional inverse lifting means 432.

Z408 shows an arrangement of GL and GH coefficients and Cb and Cr pixels of a decoded image accumulated in the component decode result memory 424. The decoded image has 4*4 pixels, and a color filter array is formed of block units of 2*2 pixels, whereby an image consists of four blocks. In Z405, four blocks are indicated by "a", "b", "c", and "d", and GL and GH coefficients and Cb and Cr pixels in the block "a" are shown in the form of GLa, GHa, Cba, and Cra, for example.

Z408 to Z404 show operating states of the two-dimensional inverse lifting means 432. On GL and GH coefficients in Z408, the same processing as that performed in Z205 to Z201 shown in FIG. 5 is performed. Z404 shows a state of the two-dimensional inverse lifting result memory 422 after two-dimensional inverse lifting has been performed.

Z402 and Z403 show operating states of the color difference inverse transform means 431. The color difference inverse transform means 431 performs processing to add a quarter of the sum of neighboring G0 and G1 pixels on each of the color components Cba, Cbb, Cbc, Cbd, Cra, Crb, Crc, and Crd other than G. For example, the color difference inverse transform means 431 performs processing to add a quarter of the sum of G0a, G1a, G1b, and G0c, to Cba. The color difference inverse transform means 431 performs similar processing on Cbb, Cbc, Cbd, Cra, Crb, Crc, and Crd. It should be noted that if there are not four neighboring G0 and G1 pixels within the image region, other G0 and G1 pixel values within the image region may be used. In the case of Cra, for example, while G0a and G1a are present on the right and the bottom, there are no G0 and G1 pixels on the left and the top. In that case, processing may be performed on the assumption that G0a and G1a are also present on the left and the top. As a result of processing, the color difference values of Cba, Cbb, Cbc, Cbd, Cra, Crb, Crc, and Crd of the input image are replaced by the pixel values of Ba, Bb, Bc, Bd, Ra, Rb, Rc, and Rd, respectively, and are stored in the image memory 421. Z401 shows a state of the image memory 421 after the color difference inverse transform has been performed.

Figure 15:
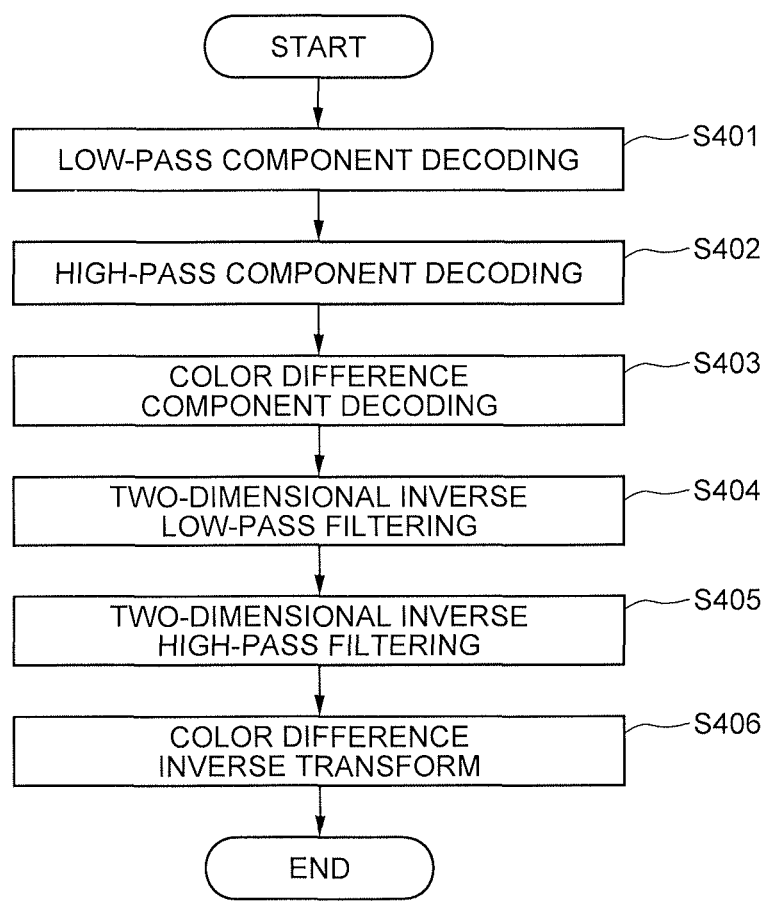
FIG. 15 is a flowchart showing decoding control of the decoding device according to the fourth exemplary embodiment of the present invention.

Next, the entire operation of the present embodiment will be described in detail with reference to the flowchart of FIG. 15.

First, the color difference and low-pass component decoding means 434 decodes low-pass coefficients GL from a code input from the code input device, and stores them in the component decode result memory 424 via the low-pass component memory 426 (S401).

Next, the high-pass component decoding means 433 decodes high-pass coefficients GH input from the code input from the code input device, and stores them in the component decode result memory 424 via the high-pass component memory 425 (S402).

Then, the color difference and low-pass component decoding means 434 decodes color difference components Cb and Cr from the code input from the code input device, and stores them in the component decode result memory 424 via the color difference component memory 427 (S403).

Then, the two-dimensional inverse low-pass filtering means 4322 reads the coefficient values GH and GL stored in the component decode result memory 424, and stores the pixel values G0 and the coefficient values GH, obtained by performing inverse low-pass filtering, in the two-dimensional lifting intermediate memory 423 (S404).

Then, the two-dimensional inverse high-pass filtering means 4321 reads the coefficient values GH and the pixel values G0 accumulated in the two-dimensional inverse lifting intermediate memory 423, and stores the pixel values G0 and G1, obtained by performing inverse high-pass filtering, in the two-dimensional inverse lifting result memory 422 (S405).

Finally, the color difference inverse transform means 431 performs color difference inverse transform on the image stored in the two-dimensional inverse lifting result memory 422, and stores the obtained image in the image memory 421 (S406).

Figure 16:
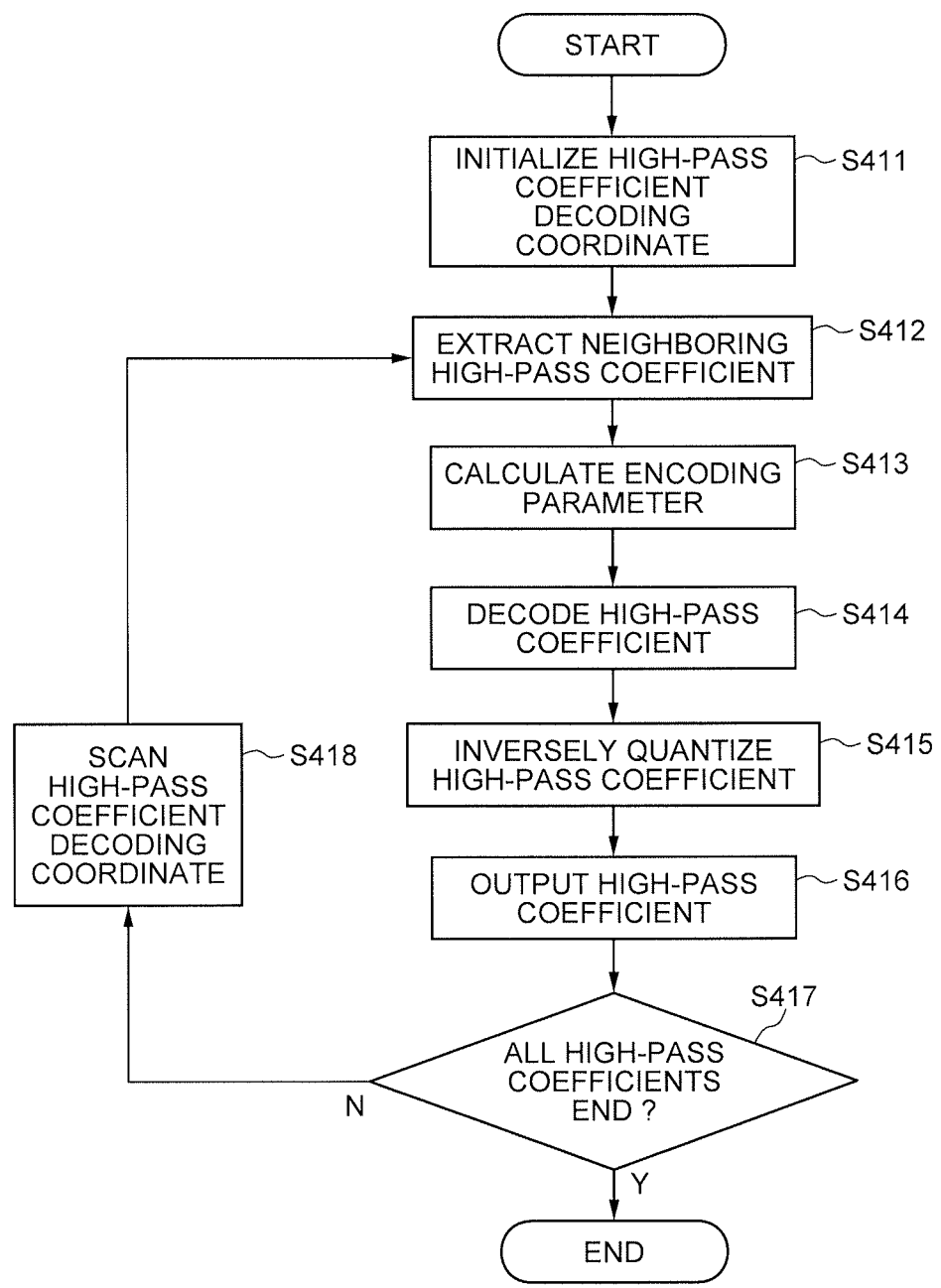
FIG. 16 is a flowchart showing high-pass component decoding control of the decoding device according to the fourth exemplary embodiment of the present invention.

Next, operation of the high-pass component decoding means 433 of the present embodiment will be described in detail with reference to the flowchart of FIG. 16.

First, the high-pass component decoding means 433 initializes a decoding coordinate of a high-pass coefficient to the origin (0.0) (S411).

Next, the neighboring coefficient reference means 4331 reads neighboring decoded high-pass coefficients from the high-pass component memory 425 (S412). Specifically, the neighboring coefficient reference means 4331 reads GH coefficients positioned at space coordinates of left (a), top (b), top left (c), and top right (d), with respect to the GH coefficient (x) to be decoded, from the high-pass component memory 425 containing only GH coefficients.

Then, the encoding parameter calculation means 4332 calculates the sum of the absolute values of the coefficients a, b, c, and d, and further, quantizes the sum value, to thereby calculate an encoding parameter (S413). In the processing of quantizing the sum value, first, the encoding parameter calculation means 43332 quantizes the sum value at a granularity which is the same quantization granularity applied to the coefficient values. Then, the encoding parameter calculation means 4332 performs arithmetic right shift by 3 bits on the quantized sum value, and takes the number of significant figures in the binary representation of the shifted value as an encoding parameter k.

Then, the coefficient decoding means 4333 performs Golomb-Rice decoding on the absolute value of the quantized coefficient by using the parameter k (S414). If the absolute value is nonzero, after the Golomb-Rice decoding, the coefficient decoding means 4333 outputs positive/negative information of the coefficient value in 1 bit.

Then, the coefficient inverse quantization means 4334 inversely quantizes the decoded coefficient value (S415), and outputs it to the high-pass component memory 425 (S416).

Then, the high-pass component decoding means 433 determines whether or not decoding of all of the high-pass coefficients have been completed (S417), and if not, the high-pass component decoding means 433 changes the decoding coordinate (S418) and returns to step S412. When all of the high-pass coefficients have been decoded, the processing ends.

The present embodiment corresponds to the decoding device of the data having been encoded in the third exemplary embodiment. When encoding a Bayer pattern image, the present embodiment has an advantageous effect of reducing the electricity included in the color components by performing color difference transform on the color components other than G, to thereby improve the compression efficiency.

While the exemplary embodiments of the present invention have been described, the present invention is not limited to those exemplary embodiments described above, and addition and modification of various types can be made thereto. It is also possible to apply the present invention to a color filter of a complementary color other than R, G, and B. Further, if the present invention is further generalized, the present invention may be applicable to an image in which a color filter array is formed in 2*2 pixel units and similar types of color components are arranged at diagonal two parts. Further, the functions of the present invention can be realized by computers and programs, as well as realizing them by hardware. A program is provided by being stored on a computer-readable storing medium such as a magnetic disk, a semiconductor memory, an optical disk, a magneto-optical disk, or the like, is read by a computer when the computer is on, and by controlling the operation of the computer, the program allows the computer to function as the respective means in the exemplary embodiments described above.

The present invention is based upon and claims the benefit of priority from Japanese patent application No. 2011-16231, filed on Jan. 28, 2011, the disclosure of which is incorporated herein in its entirety by reference.

INDUSTRIAL APPLICABILITY

The present invention is applicable to encoding and decoding of image signals or the like captured by a digital camera.

The whole or part of the exemplary embodiments disclosed above can be described as, but not limited to, the following supplementary notes.

(Supplementary Note 1)

A two-dimensional signal encoding device that encodes a Bayer pattern image output from an image pickup device, the image being formed such that a color filter array is configured in block units of 2*2 pixels and pixels having color components of the same type are arranged at two diagonal positions in the block, the two-dimensional signal encoding device comprising:

two-dimensional high-pass filtering means for, on an assumption that the pixels having the color components of the same type arranged at the two diagonal positions are a G0 pixel and a G1 pixel, calculating a GH coefficient which is a high-pass component corresponding to a space coordinate of the G1 pixel, from a value of the G1 pixel and values of four G0 pixels in the neighborhood of the G1 pixel;

two-dimensional low-pass filtering means for calculating a GL coefficient which is a low-pass component corresponding to a space coordinate of the G0 pixel, from a value of the G0 pixel and values of four GH coefficients in the neighborhood of the G0 pixel;

first encoding means for encoding a two-dimensional signal including the GH coefficient; and second encoding means for encoding a two-dimensional signal including the GL coefficient.

(Supplementary Note 2)

The two-dimensional signal encoding device, according to supplementary note 1, wherein the two-dimensional high-pass filtering means performs processing to subtract a quarter of the sum of the values of the four G0 pixels in the neighborhood of the G1 pixel, from the value of the G1 pixel, and the two-dimensional low-pass filtering means performs processing to add one eighth of the sum of the values of the four GH coefficients in the neighborhood of the G0 pixel, to the value of the G0 pixel.

(Supplementary Note 3)

The two-dimensional signal encoding device, according to supplementary note 1, wherein the two-dimensional high-pass filtering means performs processing to subtract the value of the G1 pixel from a quarter of the sum of the values of the four G0 pixels in the neighborhood of the G1 pixel, and the two-dimensional low-pass filtering means performs processing to subtract the value of the G0 pixel from one eighth of the sum of the values of the four GH coefficients in the neighborhood of the G0 pixel.

(Supplementary Note 4)

The two-dimensional signal encoding device, according to any of supplementary notes 1 to 3, further comprising:

color difference transform means for, on an assumption that pixels of color components other than the G0 pixel and the G1 pixel are an R pixel and a B pixel, calculating Cr and Cb which are color difference components in space coordinates of the R pixel and the B pixel by performing subtraction processing between values of the R pixel and the B pixel and a quarter of the sum of the values of the G0 pixel and the G1 pixel in the neighborhood of the R pixel and the B pixel; and third encoding means for encoding a two-dimensional signal including the color difference component.

(Supplementary Note 5)

The two-dimensional signal encoding device, according to any of supplementary notes 1 to 4, wherein the first encoding means performs encoding complying with JPEG 2000 in which a wavelet decomposition number is set to 0.

(Supplementary Note 6)

The two-dimensional signal encoding device, according to any of supplementary notes 1 to 4, wherein the first encoding means includes:
  encoding target coefficient extraction means for extracting a value of the GH coefficient to be encoded in the sequence of scan lines of the image;
  neighboring coefficient reference means for referring to the encoded GH coefficient from the neighborhood of the GH coefficient to be encoded;
  encoding parameter calculation means for setting an encoding parameter based on the sum of the absolute value of the encoded GH coefficient; and
  coefficient encoding means for performing variable length encoding of the GH coefficient by using the encoding parameter set by the encoding parameter calculation means.

(Supplementary Note 7)

The two-dimensional signal encoding device, according to supplementary note 6, wherein the first encoding means includes coefficient quantization means for quantizing the GH coefficient to be encoded, the neighboring coefficient reference means uses, as a value of the neighboring coefficient having been referred to, a value obtained as a result of performing quantization and inverse quantization, and the encoding parameter calculation means performs quantization processing on the sum of the absolute value of the neighboring coefficient, and sets the encoding parameter based on the value after the quantization processing.

(Supplementary Note 8)

The two-dimensional signal encoding device, according to supplementary note 6 or 7, wherein the coefficient encoding means performs Golomb-Rice encoding.

(Supplementary Note 9)

A two-dimensional signal decoding device that decodes a Bayer pattern image output from an image pickup device, the image being formed such that a color filter array is configured in block units of 2*2 pixels and pixels having color components of the same type are arranged at two diagonal positions in the block, the two-dimensional signal decoding device comprising:

first decoding means for, on an assumption that the pixels having the color components of the same type arranged at the two diagonal positions are a G0 pixel and a G1 pixel, decoding a GH coefficient which is a high-frequency component corresponding to a space coordinate of the G1 pixel;

second decoding means for decoding a GL coefficient which is a low-frequency component corresponding to a space coordinate of the G0 pixel;

two-dimensional inverse low-pass filtering means for calculating a value of the G0 pixel corresponding to the space coordinate of the G0 pixel, from a value of the GL coefficient and values of four GH coefficients in the neighborhood of the GL coefficient; and two-dimensional inverse high-pass filtering means for calculating a value of the G1 pixel corresponding to the space coordinate of the G1 pixel, from a value of the GH coefficient and values of four G0 pixels in the neighborhood of the GH coefficient.

(Supplementary Note 10)

The two-dimensional signal decoding device, according to supplementary note 9, wherein the two-dimensional inverse low-pass filtering means performs processing to subtract one eighth of the sum of the values of the four GH coefficients in the neighborhood of the GL coefficient, from the value of the GL coefficient, and the two-dimensional inverse high-pass filtering means performs processing to add a quarter of the sum of the values of the four G0 pixels in the neighborhood of the GH coefficient, to the value of the GH coefficient.

(Supplementary Note 11)

The two-dimensional signal decoding device, according to supplementary note 9, wherein the two-dimensional inverse low-pass filtering means performs processing to subtract a value of the GL coefficient from one eighth of the sum of the values of the four GH coefficients in the neighborhood of the GL coefficient, and the two-dimensional inverse high-pass filtering means performs processing to subtract a value of the GH coefficient from a quarter of the sum of the values of the four G0 pixels in the neighborhood of the GH coefficient.

(Supplementary Note 12)

The two-dimensional signal decoding device, according to any of supplementary notes 9 to 11, further comprising:

third encoding means for, on an assumption that pixels of color components other than the G0 pixel and the G1 pixel are an R pixel and a B pixel, decoding a two-dimensional signal including Cr which is a color difference component corresponding to the R pixel, and a two-dimensional signal including Cb which is a color difference component corresponding to the B pixel; and color difference inverse transform means for calculating values of the R pixel and the B pixel in space coordinates, from a value of the Cr or the Cb in each of the space coordinates and values of the G0 pixel and the G1 pixel in the neighborhood of the Cr or the Cb.

(Supplementary Note 13)

The two-dimensional signal decoding device, according to any of supplementary notes 9 to 12, wherein the first decoding means performs decoding complying with JPEG 2000 in which a wavelet decomposition number is set to 0.

(Supplementary Note 14)

The two-dimensional signal decoding device, according to any of supplementary notes 9 to 12, wherein the first decoding means includes:
  decoding target coefficient selection means for selecting the GH coefficient to be decoded in the sequence of scan lines of the image;
  neighboring coefficient reference means for referring to the decoded GH coefficient from the neighborhood of the GH coefficient to be decoded;
  encoding parameter calculation means for setting an encoding parameter based on the sum of the absolute value of the decoded GH coefficient; and
  coefficient decoding means for decoding a variable length code of the GH coefficient by using the encoding parameter set by the encoding parameter calculation means.

(Supplementary Note 15)

The two-dimensional signal decoding device, according to supplementary note 14, wherein the first decoding means includes coefficient inverse quantization means for inversely quantizing the GH coefficient to be decoded, and the encoding parameter calculation means performs quantization processing on the sum of the absolute value of the neighboring coefficient, and sets the encoding parameter based on the value after the quantization processing.

(Supplementary Note 16)

The two-dimensional signal decoding device, according to supplementary note 14 or 15, wherein the coefficient decoding means performs decoding of a Golomb-Rice code.

(Supplementary Note 17)

A two-dimensional signal encoding method for encoding a Bayer pattern image output from an image pickup device, the image being formed such that a color filter array is configured in block units of 2*2 pixels and pixels having color components of the same type are arranged at two diagonal positions in the block, the method comprising:

on an assumption that the pixels having the color components of the same type arranged at the two diagonal positions are a G0 pixel and a G1 pixel, calculating a GH coefficient which is a high-pass component corresponding to a space coordinate of the G1 pixel, from a value of the G1 pixel and values of four G0 pixels in the neighborhood of the G1 pixel;

calculating a GL coefficient which is a low-pass component corresponding to a space coordinate of the G0 pixel, from a value of the G0 pixel and values of four GH coefficients in the neighborhood of the G0 pixel;

encoding a two-dimensional signal including the GH coefficient; and encoding a two-dimensional signal including the GL coefficient.

(Supplementary Note 18)

The two-dimensional signal encoding method, according to supplementary note 17, wherein the calculating the GH coefficient includes performing processing to subtract a quarter of the sum of the values of the four G0 pixels in the neighborhood of the G1 pixel, from the value of the G1 pixel, and the calculating the GL coefficient includes performing processing to add one eighth of the sum of the values of the four GH coefficients in the neighborhood of the G0 pixel, to the value of the G0 pixel.

(Supplementary Note 19)

The two-dimensional signal encoding method, according to supplementary note 17, wherein the calculating the GH coefficient includes performing processing to subtract the value of the G1 pixel from a quarter of the sum of the values of the four G0 pixels in the neighborhood of the G1 pixel, and the calculating the GL coefficient includes performing processing to subtract the value of the G0 pixel from one eighth of the sum of the values of the four GH coefficients in the neighborhood of the G0 pixel.

(Supplementary Note 20)

A two-dimensional signal decoding method for decoding a Bayer pattern image output from an image pickup device, the image being formed such that a color filter array is configured in block units of 2*2 pixels and pixels having color components of the same type are arranged at two diagonal positions in the block, the method comprising:

on an assumption that the pixels having the color components of the same type arranged at the two diagonal positions are a G0 pixel and a G1 pixel, decoding a GH coefficient which is a high-frequency component corresponding to a space coordinate of the G1 pixel;

decoding a GL coefficient which is a low-frequency component corresponding to a space coordinate of the G0 pixel;

calculating a value of the G0 pixel corresponding to the space coordinate of the G0 pixel, from a value of the GL coefficient and values of four GH coefficients in the neighborhood of the GL coefficient; and calculating a value of the G1 pixel corresponding to the space coordinate of the G1 pixel, from a value of the GH coefficient and values of four G0 pixels in the neighborhood of the GH coefficient.

(Supplementary Note 21)

The two-dimensional signal decoding method, according to supplementary note 20, wherein the calculating the value of the G0 pixel includes performing processing to subtract one eighth of the sum of the values of the four GH coefficients in the neighborhood of the GL coefficient, from the value of the GL coefficient, and the calculating the value of the G1 pixel includes performing processing to add a quarter of the sum of the values of the four G0 pixels in the neighborhood of the GH coefficient, to the value of the GH coefficient.

(Supplementary Note 22)

The two-dimensional signal decoding method, according to supplementary note 20, wherein the calculating the value of the G0 pixel includes performing processing to subtract the value of the GL pixel from one eighth of the sum of the values of the four GH coefficients in the neighborhood of the GL pixel, and the calculating the value of the G1 pixel includes performing processing to subtract the value of the GH pixel from a quarter of the sum of the values of the four G0 pixels in the neighborhood of the GH pixel.

(Supplementary Note 23)

A program for causing a computer that encodes a Bayer pattern image output from an image pickup device to function as, the image being formed such that a color filter array is configured in block units of 2*2 pixels and pixels having color components of the same type are arranged at two diagonal positions in the block:

two-dimensional high-pass filtering means for, on an assumption that the pixels having the color components of the same type arranged at the two diagonal positions are a G0 pixel and a G1 pixel, calculating a GH coefficient which is a high-pass component corresponding to a space coordinate of the G1 pixel, from a value of the G1 pixel and values of four G0 pixels in the neighborhood of the G1 pixel;

two-dimensional low-pass filtering means for calculating a GL coefficient which is a low-pass component corresponding to a space coordinate of the G0 pixel, from a value of the G0 pixel and values of four GH coefficients in the neighborhood of the G0 pixel;

first encoding means for encoding a two-dimensional signal including the GH coefficient; and second encoding means for encoding a two-dimensional signal including the GL coefficient.

(Supplementary Note 24)

A program for causing a computer that decodes a Bayer pattern image output from an image pickup device to function as, the image being formed such that a color filter array is configured in block units of 2*2 pixels and pixels having color components of the same type are arranged at two diagonal positions in the block:

first decoding means for, on an assumption that the pixels having the color components of the same type arranged at the two diagonal positions are a G0 pixel and a G1 pixel, decoding a GH coefficient which is a high-frequency component corresponding to a space coordinate of the G1 pixel;

second decoding means for decoding a GL coefficient which is a low-frequency component corresponding to a space coordinate of the G0 pixel;

two-dimensional inverse low-pass filtering means for calculating a value of the G0 pixel corresponding to the space coordinate of the G0 pixel, from a value of the GL coefficient and values of four GH coefficients in the neighborhood of the GL coefficient; and two-dimensional inverse high-pass filtering means for calculating a value of the G1 pixel corresponding to the space coordinate of the G1 pixel, from a value of the GH coefficient and values of four G0 pixels in the neighborhood of the GH coefficient.

DESCRIPTION OF REFERENCE NUMERALS 11 image input device
12 data storage device
13 data processing device
121 image memory
122 two-dimensional lifting intermediate memory
123 two-dimensional lifting result memory
124 high-pass component memory
125 low-pass component memory
131 two-dimensional lifting means
132 high-pass component encoding means
133 low-pass component encoding means
1311 two-dimensional high-pass filtering means
1312 two-dimensional low-pass filtering means
14 encoding device

The invention claimed is:

1. A two-dimensional signal encoding device that encodes a Bayer pattern image output from an image pickup device, the image being formed such that a color filter array is configured in block units of 2*2 pixels and pixels having color components of the same type are arranged at two diagonal positions in the block, the two-dimensional signal encoding device comprising:
   a two-dimensional high-pass filtering unit that, on an assumption that the pixels having the color components of the same type arranged at the two diagonal positions are a G0 pixel and a G1 pixel, calculates a GH coefficient which is a high-pass component corresponding to a space coordinate of the G1 pixel, from a value of the G1 pixel and values of four G0 pixels in the neighborhood of the G1 pixel;
   a two-dimensional low-pass filtering unit that calculates a GL coefficient which is a low-pass component corresponding to a space coordinate of the G0 pixel, from a value of the G0 pixel and values of four GH coefficients in the neighborhood of the G0 pixel;
   a first encoding unit that encodes a two-dimensional signal including the GH coefficient; and
   a second encoding unit that encodes a two-dimensional signal including the GL coefficient.

2. The two-dimensional signal encoding device, according to claim 1, wherein
   the two-dimensional high-pass filtering unit performs processing to subtract a quarter of the sum of the values of the four G0 pixels in the neighborhood of the G1 pixel, from the value of the G1 pixel, and
   the two-dimensional low-pass filtering unit performs processing to add one eighth of the sum of the values of the four GH coefficients in the neighborhood of the G0 pixel, to the value of the G0 pixel.

3. The two-dimensional signal encoding device, according to claim 1, wherein
   the two-dimensional high-pass filtering unit performs processing to subtract the value of the G1 pixel from a quarter of the sum of the values of the four G0 pixels in the neighborhood of the G1 pixel, and
   the two-dimensional low-pass filtering unit performs processing to subtract the value of the G0 pixel from one eighth of the sum of the values of the four GH coefficients in the neighborhood of the G0 pixel.

4. The two-dimensional signal encoding device, according to claim 1, further comprising:
   a color difference transform unit that, on an assumption that pixels of color components other than the G0 pixel and the G1 pixel are an R pixel and a B pixel, calculates Cr and Cb which are color difference components in space coordinates of the R pixel and the B pixel by performing subtraction processing between values of the R pixel and the B pixel and a quarter of the sum of the values of the G0 pixel and the G1 pixel in the neighborhood of the R pixel and the B pixel; and
   a third encoding unit that encodes a two-dimensional signal including the color difference component.

5. A two-dimensional signal decoding device that decodes a Bayer pattern image output from an image pickup device, the image being formed such that a color filter array is configured in block units of 2*2 pixels and pixels having color components of the same type are arranged at two diagonal positions in the block, the two-dimensional signal decoding device comprising:
   a first decoding unit that, on an assumption that the pixels having the color components of the same type arranged at the two diagonal positions are a G0 pixel and a G1 pixel, decodes a GH coefficient which is a high-frequency component corresponding to a space coordinate of the G1 pixel;
   a second decoding unit that decodes a GL coefficient which is a low-frequency component corresponding to a space coordinate of the G0 pixel;
   a two-dimensional inverse low-pass filtering unit that calculates a value of the G0 pixel corresponding to the space coordinate of the G0 pixel, from a value of the GL coefficient and values of four GH coefficients in the neighborhood of the GL coefficient; and
   a two-dimensional inverse high-pass filtering unit that calculates a value of the G1 pixel corresponding to the space coordinate of the G1 pixel, from a value of the GH coefficient and values of four G0 pixels in the neighborhood of the GH coefficient.

6. A two-dimensional signal encoding method for encoding a Bayer pattern image output from an image pickup device, the image being formed such that a color filter array is configured in block units of 2*2 pixels and pixels having color components of the same type are arranged at two diagonal positions in the block, the method comprising:
   on an assumption that the pixels having the color components of the same type arranged at the two diagonal positions are a G0 pixel and a G1 pixel, calculating a GH coefficient which is a high-pass component corresponding to a space coordinate of the G1 pixel, from a value of the G1 pixel and values of four G0 pixels in the neighborhood of the G1 pixel;
   calculating a GL coefficient which is a low-pass component corresponding to a space coordinate of the G0 pixel, from a value of the G0 pixel and values of four GH coefficients in the neighborhood of the G0 pixel;

encoding a two-dimensional signal including the GH coefficient; and encoding a two-dimensional signal including the GL coefficient.

* * * * *